United States Patent
Shutty et al.

(10) Patent No.: US 8,601,813 B2
(45) Date of Patent: Dec. 10, 2013

(54) CONTROLLING EXHAUST GAS RECIRCULATION IN A TURBOCHARGED ENGINE SYSTEM

(75) Inventors: John Shutty, Clarkston, MI (US); Volker Joergl, Breitenfurt (AT)

(73) Assignee: BorgWarner Inc., Auburn Hills, MI (US)

(*) Notice: Subject to any disclaimer, the term of this patent is extended or adjusted under 35 U.S.C. 154(b) by 854 days.

(21) Appl. No.: 12/532,662

(22) PCT Filed: Mar. 14, 2008

(86) PCT No.: PCT/US2008/056955
§ 371 (c)(1),
(2), (4) Date: Dec. 8, 2009

(87) PCT Pub. No.: WO2008/118660
PCT Pub. Date: Oct. 2, 2008

(65) Prior Publication Data
US 2010/0101226 A1 Apr. 29, 2010

Related U.S. Application Data

(60) Provisional application No. 60/908,528, filed on Mar. 28, 2007.

(51) Int. Cl.
*F02B 33/44* (2006.01)
*F02M 25/07* (2006.01)

(52) U.S. Cl.
USPC .................................. 60/605.2; 701/108

(58) Field of Classification Search
USPC .................................. 60/605.2; 701/108
IPC .................................... F02M 25/07
See application file for complete search history.

(56) References Cited

U.S. PATENT DOCUMENTS

| | | | |
|---|---|---|---|
| 6,460,522 B1 | 10/2002 | Rimnac | 60/605.2 |
| 6,725,848 B2 | 4/2004 | Ramamurthy et al. | 123/568.22 |
| 6,748,936 B2 | 6/2004 | Kinomura et al. | 123/568.22 |
| 7,273,045 B2* | 9/2007 | Kurtz et al. | 60/605.2 |
| 7,367,188 B2* | 5/2008 | Barbe et al. | 60/605.2 |
| 7,380,400 B2* | 6/2008 | Barbe et al. | 60/605.2 |
| 7,469,691 B2 | 12/2008 | Joergl et al. | 60/605.2 |
| 7,493,762 B2* | 2/2009 | Barbe et al. | 60/605.2 |
| 7,512,479 B1* | 3/2009 | Wang | 701/103 |

(Continued)

OTHER PUBLICATIONS

PCT/US2008/056955 Search Report and Written Opinion; Forms PCT/ISA/210, PCT/ISA/237; Mailed Jun. 24, 2008; 6 pages.

*Primary Examiner* — Thai Ba Trieu
(74) *Attorney, Agent, or Firm* — BrooksGroup

(57) ABSTRACT

One embodiment may include a method of controlling exhaust gas recirculation (EGR) in a turbocharged compression-ignition engine system including a high pressure (HP) EGR path and a low pressure (LP) EGR path. The method may include determining a target total EGR fraction for compliance with exhaust emissions criteria, and determining a target HP/LP EGR ratio to optimize other engine system criteria within the constraints of the determined target total EGR fraction. The determining of the target HP/LP EGR ratio may include using at least engine speed and load as input to a base model to output a base EGR value, using at least one other engine system parameter as input to at least one adjustment model to output at least one EGR adjustment value, and adjusting the base EGR value with the at least one EGR adjustment value to generate at least one adjusted EGR value.

38 Claims, 14 Drawing Sheets

(56) References Cited

U.S. PATENT DOCUMENTS

| | | | |
|---|---|---|---|
| 8,036,813 B2 * | 10/2011 | Tonetti et al. | 60/605.2 |
| 8,042,527 B2 * | 10/2011 | Styles et al. | 123/568.12 |
| 8,096,125 B2 * | 1/2012 | Hepburn et al. | 60/605.2 |
| 8,196,404 B2 * | 6/2012 | Onishi et al. | 60/605.2 |
| 2003/0188727 A1 | 10/2003 | van Nieuwstadt | 60/605.2 |
| 2011/0010079 A1 * | 1/2011 | Shutty et al. | 701/108 |
| 2011/0079008 A1 * | 4/2011 | de Ojeda | 60/605.2 |
| 2011/0088674 A1 * | 4/2011 | Shutty et al. | 123/568.21 |

* cited by examiner

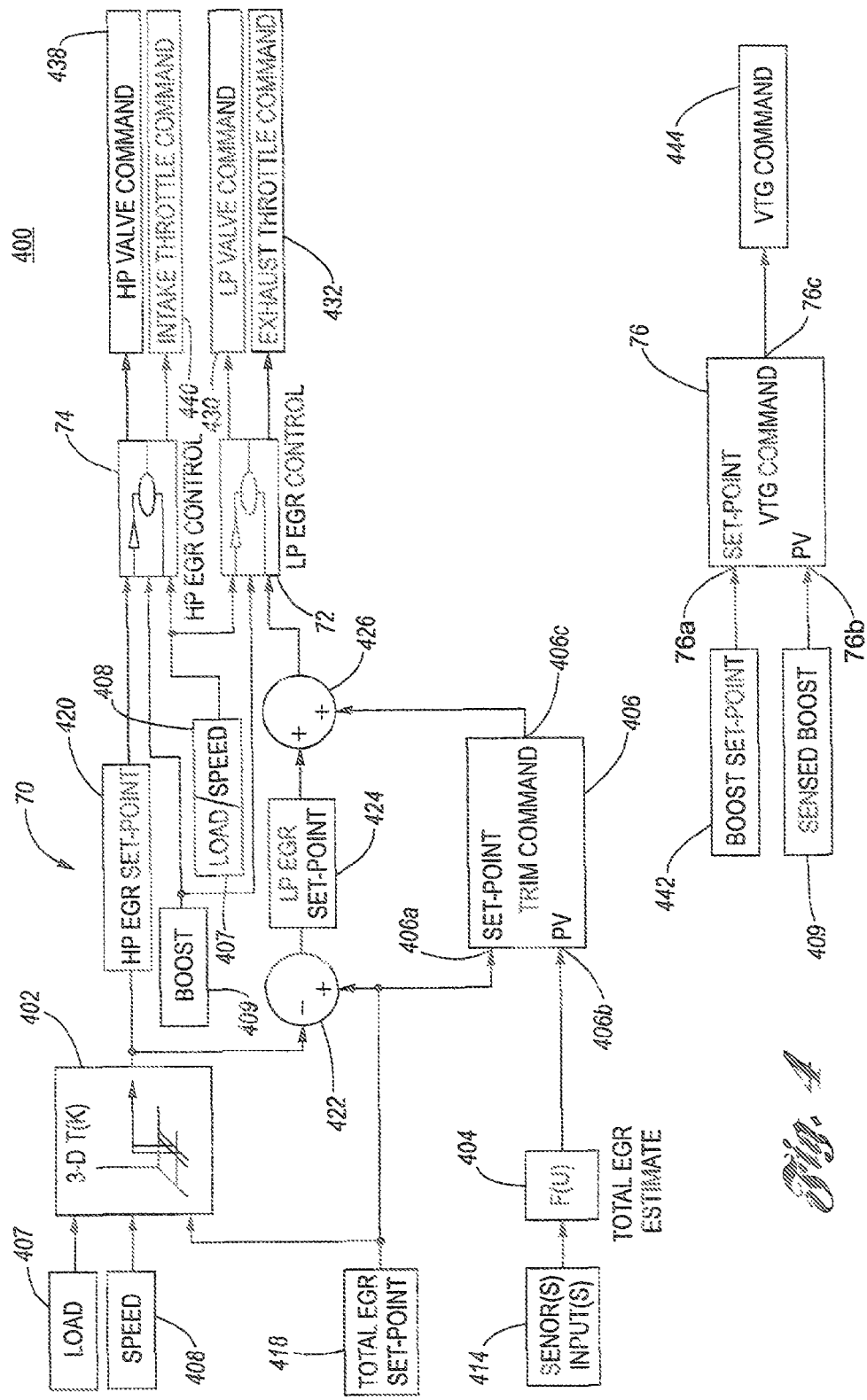

ically carry exhaust gases away from the engine combustion
CONTROLLING EXHAUST GAS RECIRCULATION IN A TURBOCHARGED ENGINE SYSTEM This application claims the benefit of U.S. Provisional Application No. 60/908,528 filed Mar. 28, 2007.

TECHNICAL FIELD

The field to which the disclosure generally relates includes controlling exhaust gas recirculation within turbocharged compression-ignition engine systems.

BACKGROUND

Turbocharged engine systems include engines having combustion chambers for combusting air and fuel for conversion into mechanical power, air induction subsystems for conveying induction gases to the combustion chambers, and engine exhaust subsystems. The exhaust subsystems typically carry exhaust gases away from the engine combustion chambers, muffle engine exhaust noise, and reduce exhaust gas particulates and oxides of nitrogen (NOx), which increase as engine combustion temperatures increase. Exhaust gas is often recirculated out of the exhaust gas subsystem, into the induction subsystem for mixture with fresh air, and back to the engine. Exhaust gas recirculation increases the amount of inert gas and concomitantly reduces oxygen in the induction gases, thereby reducing engine combustion temperatures and, thus, reducing NOx formation.

SUMMARY OF EXEMPLARY EMBODIMENTS OF THE INVENTION

One exemplary embodiment includes a method of controlling exhaust gas recirculation (EGR) in a turbocharged engine system including a high pressure (HP) EGR path and a low pressure (LP) EGR path. The method may include determining a target total EGR fraction for compliance with exhaust emissions criteria, and determining a target HP/LP EGR ratio to optimize other engine system criteria within the constraints of the determined target total EGR fraction. The determining of the target HP/LP EGR ratio may include using at least engine speed and load as input to a base model to output a base EGR value, using at least one other engine system parameter as input to at least one adjustment model to output at least one EGR adjustment value, and adjusting the base EGR value with the at least one EGR adjustment value to generate at least one adjusted EGR value.

Another exemplary embodiment includes a method of controlling exhaust gas recirculation (EGR) in a turbocharged engine system including a high pressure (HP) EGR path and a low pressure (LP) EGR path. The method may include determining a target total EGR fraction for compliance with exhaust emissions criteria, and determining a target HP/LP EGR ratio to optimize other engine system criteria within the constraints of the determined target total EGR fraction. The determining of the target HP/LP EGR ratio may include using at least engine speed and load in at least one model to output an LP EGR value and an HP EGR value, applying the target total EGR fraction to the LP and HP EGR values to establish LP and HP EGR setpoints, and delaying downstream communication of the HP EGR value to account for lag time between LP and HP EGR.

Other exemplary embodiments of the invention will become apparent from the following detailed description. It should be understood that the detailed description and specific examples, while indicating the exemplary embodiment of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIG. 4 is a block diagram illustrating a preferred control flow portion of the method of FIG. 3 and including a total EGR estimation block and high and low pressure EGR open-loop control blocks;

DETAILED DESCRIPTION OF EXEMPLARY EMBODIMENTS

The following description of the embodiments is merely exemplary in nature and is in no way intended to limit the invention, its application, or uses.

Exemplary System

Figure 1:
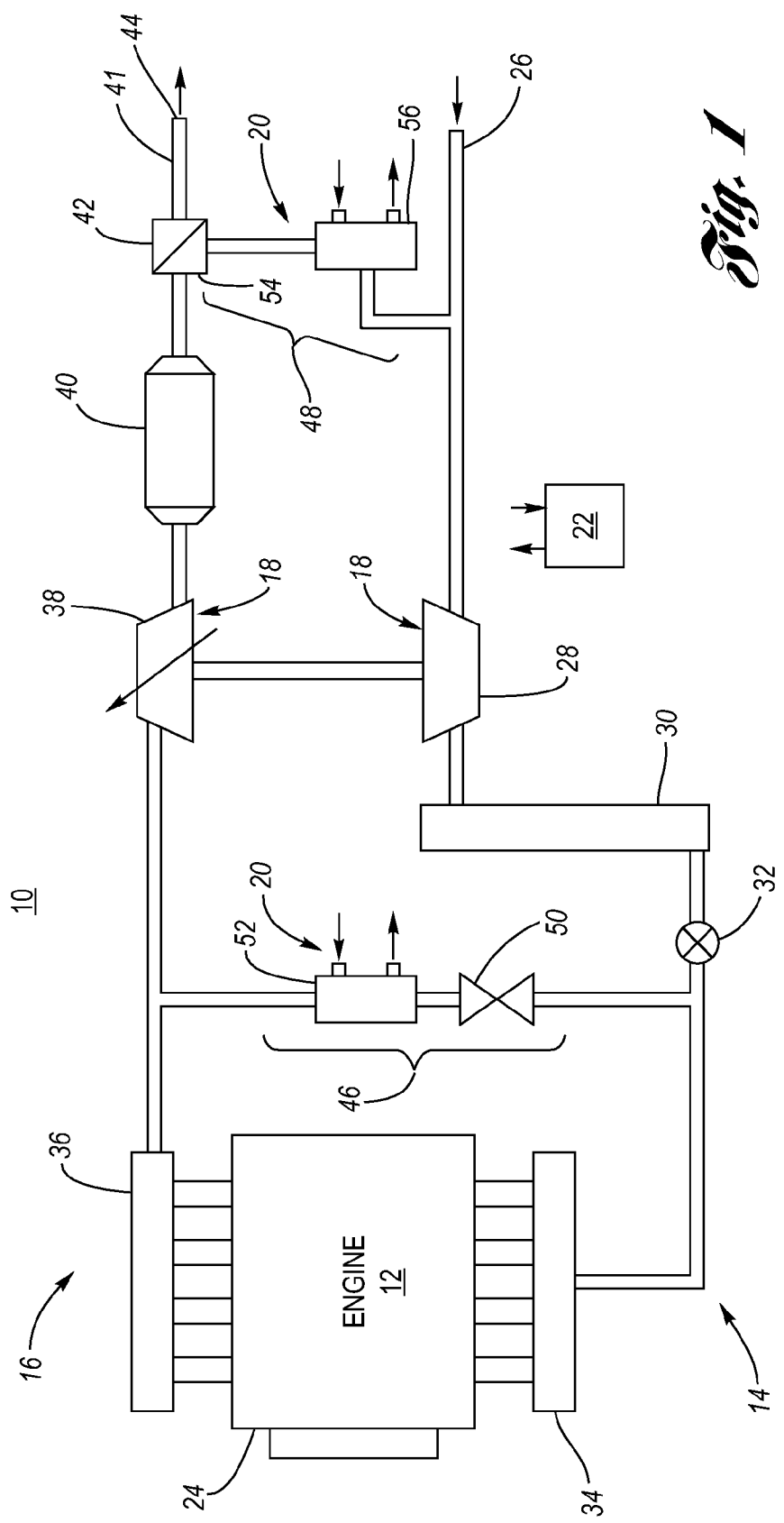
FIG. 1 is a schematic view of an exemplary embodiment of an engine system including an exemplary control subsystem.

An exemplary operating environment is illustrated in FIG. 1, and may be used to implement a presently disclosed method of EGR control. The method may be carried out using any suitable system and, preferably, is carried out in conjunction with an engine system such as system 10. The following system description simply provides a brief overview of one exemplary engine system, but other systems and components not shown here could also support the presently disclosed method.

In general, the system 10 may include an internal combustion engine 12 to develop mechanical power from internal combustion of a mixture of fuel and induction gases, an induction subsystem 14 to generally provide the induction gases to the engine 12 and, an exhaust subsystem 16 to convey combustion gases generally away from the engine 12. The engine 12 may be constructed and arranged to combust diesel, gasoline or other combustible fuels. As used herein, the phrase induction gases may include fresh air and recirculated exhaust gases. The system 10 also generally may include a turbocharger 18 in communication across the exhaust and induction subsystems 14, 16 to compress inlet air to improve combustion and thereby increase engine output. The system 10 further generally may include an exhaust gas recirculation subsystem 20 across the exhaust and induction subsystems 14, 16 to recirculate exhaust gases for mixture with fresh air to improve emissions performance of the engine system 10. The system 10 further generally may include a control subsystem 22 to control operation of the engine system 10. Those skilled in the art will recognize that a fuel subsystem (not shown) is used to provide any suitable liquid and/or gaseous fuel to the engine 12 for combustion therein with the induction gases.

The internal combustion engine 12 may be any suitable type of engine, such as an autoignition or compression-ignition engine like a diesel engine. The engine 12 may include a block 24 with cylinders and pistons therein (not separately shown), which along with a cylinder head (also not separately shown), define combustion chambers (not shown) for internal combustion of a mixture of fuel and induction gases.

The induction subsystem 14 may include, in addition to suitable conduit and connectors, an inlet end 26 which may have an air filter (not shown) to filter incoming air, and a turbocharger compressor 28 downstream of the inlet end 26 to compress the inlet air. The induction subsystem 14 may also include a charge air cooler 30 downstream of the turbocharger compressor 28 to cool the compressed air, and an intake throttle valve 32 downstream of the charge air cooler 30 to throttle the flow of the cooled air to the engine 12. The induction subsystem 14 also may include an intake manifold 34 downstream of the throttle valve 32 and upstream of the engine 12, to receive the throttled air and distribute it to the engine combustion chambers.

The exhaust subsystem 16 may include, in addition to suitable conduit and connectors, an exhaust manifold 36 to collect exhaust gases from the combustion chambers of the engine 12 and convey them downstream to the rest of the exhaust subsystem 16. The exhaust subsystem 16 also may include a turbocharger turbine 38 in downstream communication with the exhaust manifold 36. The turbocharger 18 may be a variable turbine geometry (VTG) type of turbocharger, a dual stage turbocharger, or a turbocharger with a wastegate or bypass device, or the like. In any case, the turbocharger 18 and/or any turbocharger accessory device(s) may be adjusted to affect any one or more of the following parameters: turbocharger boost pressure, air mass flow, and/or EGR flow. The exhaust subsystem 16 may also include any suitable emissions device(s) 40 such as a catalytic converter like a close-coupled diesel oxidation catalyst (DOC) device, a nitrogen oxide (NOx) adsorber unit, a particulate filter, or the like. The exhaust subsystem 16 may also include an exhaust throttle valve 42 disposed upstream of an exhaust outlet 44.

The EGR subsystem 20 is preferably a hybrid or dual path EGR subsystem to recirculate portions of the exhaust gases from the exhaust subsystem 16 to the induction subsystem 14 for combustion in the engine 12. Accordingly, the EGR subsystem 20 may include two paths: a high pressure (HP) EGR path 46 and a low pressure (LP) EGR path 48. Preferably, the HP EGR path 46 may be connected to the exhaust subsystem 16 upstream of the turbocharger turbine 38 but connected to the induction subsystem 12 downstream of the turbocharger compressor 28. Also preferably, the LP EGR path 48 may be connected to the exhaust subsystem 16 downstream of the turbocharger turbine 38 but connected to the induction subsystem 14 upstream of the turbocharger compressor 28. Any other suitable connection between the exhaust and induction sub-systems 14, 16 is also contemplated including other forms of HP EGR such as the usage of internal engine variable valve timing and lift to induce internal HP EGR. According to internal HP EGR, operation of engine exhaust and intake valves may be timed so as to communicate some exhaust gases generated during one combustion event back through intake valves so that exhaust gases are combusted in a subsequent combustion event.

The HP EGR path 46 may include, in addition to suitable conduit and connectors, an HP EGR valve 50 to control recirculation of exhaust gases from the exhaust subsystem 16 to the induction subsystem 14. The HP EGR valve 50 may be a stand-alone device having its own actuator or may be integrated with the intake throttle valve 32 into a combined device having a common actuator. The HP EGR path 46 may also include an HP EGR cooler 52 upstream, or optionally downstream, of the HP EGR valve 50 to cool the HP EGR gases. The HP EGR path 46 may be connected upstream of the turbocharger turbine 38 and downstream of the throttle valve 32 to mix HP EGR gases with throttled air and other induction gases (the air may have LP EGR).

The LP EGR path 48 may include, in addition to suitable conduit and connectors, an LP EGR valve 54 to control recirculation of exhaust gases from the exhaust subsystem 16 to the induction subsystem 14. The LP EGR valve 54 may be a stand-alone device having its own actuator or may be integrated with the exhaust throttle valve 42 into a combined device having a common actuator. The LP EGR path 48 may also include an LP EGR cooler 56 downstream, or optionally upstream, of the LP EGR valve 54 to cool the LP EGR gases. The LP EGR path 48 may be connected downstream of the turbocharger turbine 38 and upstream of the turbocharger compressor 28 to mix LP EGR gases with filtered inlet air.

Figure 2:
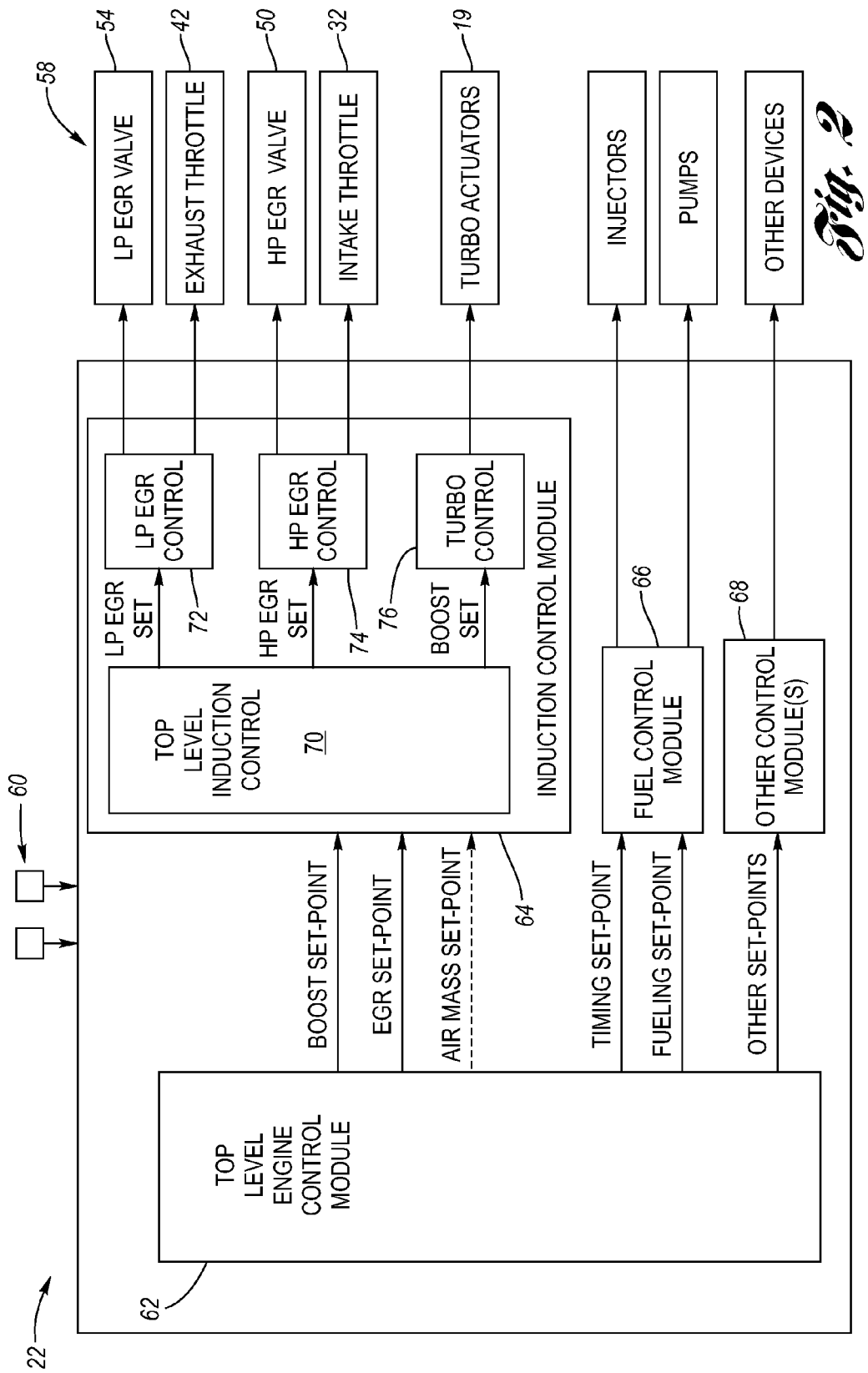
FIG. 2 is a block diagram of the exemplary control subsystem of the engine system of FIG. 1.

Referring now to FIG. 2, the control subsystem 22 may include any suitable hardware, software, and/or firmware to carry out at least some portions of the methods disclosed herein. For example, the control subsystem 22 may include some or all of the engine system actuators 58 discussed above, as well as various engine sensors 60. The engine system sensors 60 are not individually shown in the drawings but may include any suitable devices to monitor engine system parameters.

For example, an engine speed sensor may measure the rotational speed of an engine crankshaft (not shown), pressure sensors in communication with the engine combustion chambers may measure engine cylinder pressure, intake and exhaust manifold pressure sensors may measure pressure of gases flowing into and away from the engine cylinders, an inlet air mass flow sensor may measure incoming airflow in the induction subsystem 14, and a manifold mass flow sensor may measure flow of induction gases to the engine 12. In another example, the engine system 10 may include a temperature sensor to measure the temperature of induction gases flowing to the engine cylinders, and a temperature sensor downstream of the air filter and upstream of the turbocharger compressor 28. In a further example, the engine system 10 may include a speed sensor suitably coupled to the turbocharger compressor 28 to measure the rotational speed thereof. A throttle position sensor, such as an integrated angular position sensor, may measure the position of the throttle valve 32. A position sensor may be disposed in proximity to the turbocharger 18 to measure the position of the variable geometry turbine 38. A tailpipe temperature sensor may be placed just upstream of a tailpipe outlet to measure the temperature of the exhaust gases exiting the exhaust subsystem 16. Also, temperature sensors may be placed upstream and downstream of the emissions device(s) 40 to measure the temperature of exhaust gases at the inlet(s) and outlet(s) thereof. Similarly, one or more pressure sensors may be placed across the emissions device(s) 40 to measure the pressure drop thereacross. An oxygen ($O_2$) sensor may be placed in the exhaust and/or induction subsystems 14, 16, to measure oxygen in the exhaust gases and/or induction gases. Finally, position sensors may measure the positions of the HP and LP EGR valves 50, 54 and the exhaust throttle valve 42.

In addition to the sensors 60 discussed herein, any other suitable sensors and their associated parameters may be encompassed by the presently disclosed system and methods. For example, the sensors 60 may also include accelerator sensors, vehicle speed sensors, powertrain speed sensors, filter sensors, other flow sensors, vibration sensors, knock sensors, intake and exhaust pressure sensors, and/or the like. In other words, any sensors may be used to sense any suitable physical parameters including electrical, mechanical, and chemical parameters. As used herein, the term sensor may include any suitable hardware and/or software used to sense any engine system parameter and/or various combinations of such parameters.

The control subsystem 22 may further include one or more controllers (not shown) in communication with the actuators 58 and sensors 60 for receiving and processing sensor input and transmitting actuator output signals. The controller(s) may include one or more suitable processors and memory devices (not shown). The memory may be configured to provide storage of data and instructions that provides at least some of the functionality of the engine system 10 and that may be executed by the processor(s). At least portions of the method may be enabled by one or more computer programs and various engine system data or instructions stored in memory as look-up tables, formulas, algorithms, maps, models, or the like. In any case, the control subsystem 22 may control engine system parameters by receiving input signals from the sensors 60, executing instructions or algorithms in light of sensor input signals, and transmitting suitable output signals to the various actuators 58.

The control subsystem 22 may include one or more modules in the controller(s). For example, a top level engine control module 62 may receive and process any suitable engine system input signals and communicates output signals to an induction control module 64, a fuel control module 66, and any other suitable control modules 68. As will be discussed in greater detail below, the top level engine control module 62 may receive and process input signals from one or more of the engine system parameter sensors 60 to estimate total EGR fraction in any suitable manner. The modules 62, 64, 66, 68, may be separate as shown, or may be integrated or combined into one or more modules, which may include any suitable hardware, software, and/or firmware.

Various methods of estimating EGR fraction are known to those skilled in the art. As used herein, the phrase "total EGR fraction" may include one or more of its constituent parameters, and may be represented by the following equation:

$$r_{EGR} = \left(1 - \frac{MAF}{M_{ENG}}\right) * 100 = \left(\frac{M_{EGR}}{M_{ENG}}\right) * 100$$

where
  MAF is fresh air mass flow into an induction subsystem,
  $M_{EGR}$ is EGR mass flow into the induction subsystem,
  $M_{ENG}$ is induction gas mass flow to an engine, and
  $r_{EGR}$ includes that portion of induction gases entering an engine attributable to recirculated exhaust gases.

From the above equation, the total EGR fraction may be calculated using the fresh air mass flow sensor and induction gas mass flow from a sensor or from an estimate thereof, or using an estimate of total EGR fraction itself and the induction gas mass flow. In either case, the top level engine control module 62 may include suitable data inputs to estimate the total EGR fraction directly from one or more mass flow sensor measurements or estimations as input to one or more engine system models.

As used herein, the term "model" may include any construct that represents something using variables, such as a look up table, map, formula, algorithm and/or the like. Models may be application specific and particular to the exact design and performance specifications of any given engine system. In one example, the engine system models in turn may be based on engine speed and intake manifold pressure and temperature. The engine system models may be updated each time engine parameters change, and may be multi-dimensional look up tables using inputs including engine speed and engine intake gas density, which may be determined with the intake pressure, temperature, and universal gas constant.

The total EGR fraction may be correlated, directly or indirectly via its constituents, to one or more engine system parameters, such as estimated or sensed air mass flow, $O_2$, or engine system temperature(s). Such parameters may be analyzed in any suitable fashion for correlation with the total EGR fraction. For example, the total EGR fraction may be formulaically related to the other engine system parameters. In another example, from engine calibration or modeling, the total EGR fraction may be empirically and statistically related to the other engine system parameters. In any case, where the total EGR fraction is found to reliably correlate to any other engine system parameter(s), that correlation may be modeled formulaically, empirically, acoustically, and/or the like. For example, empirical models may be developed from suitable testing and may include lookup tables, maps, formulas, algorithm, or the like that may be processed in the total EGR fraction values with other engine system parameter values.

Accordingly, an engine system parameter may be used as a proxy for direct sensor measurements of total EGR fraction and/or individual HP and/or LP EGR flow. Accordingly, total EGR, HP EGR, and LP EGR flow sensors may be eliminated, thereby saving on engine system cost and weight. Elimination of such sensors also leads to elimination of other sensor-related hardware, software, and costs, such as wiring, connector pins, computer processing power and memory, and so on.

Also, the top level engine control 62 module may calculate a turbocharger boost pressure setpoint and a target total EGR setpoint, and transmit these setpoints to the induction control module 64. Similarly, the top level engine control module 62 may calculate suitable timing and fueling setpoints and transmit them to the fuel control module 66, and may calculate other setpoints and transmit them to the other control modules 68. The fuel and other control modules 66, 68 may receive and process such inputs, and may generate suitable command signals to any suitable engine system devices such as fuel injectors, fuel pumps, or other devices.

Alternatively, the top level engine control module 62 may calculate and transmit the boost pressure setpoint and a total intake air mass flow setpoint (as shown in dashed lines), instead of the target total EGR setpoint. In this alternative case, the total EGR setpoint may be subsequently determined from the air mass flow setpoint in much the same way the actual total EGR fraction is estimated from the actual mass flow sensor readings. In a second alternative, air mass flow may replace total EGR fraction throughout the control method. This changes the types of data used and the manner in which HP and LP EGR flow targets are set, but the basic structure of the controller and flow of the control method is the same.

The induction control module 64 may receive any suitable engine system parameter values, in addition to the setpoints received from the top level engine control module 62. For example, the induction control module 64 may receive induction and/or exhaust subsystem parameter values like turbocharger boost pressure, and mass flow. The induction control module 64 may include a top level induction control submodule 70 that may process the received parameter values, and transmit any suitable outputs such as LP and HP EGR setpoints and turbocharger setpoints to respective LP EGR, HP EGR, and turbocharger control submodules 72, 74, 76. The LP EGR, HP EGR, and turbocharger control submodules 72, 74, 76 may process such induction control submodule outputs and may generate suitable command signals to various engine system devices such as the LP EGR valve 54 and exhaust throttle valve 42, HP EGR valve 50 and intake throttle valve 32, and one or more turbocharger actuators 19. The various modules and/or submodules may be separate as shown, or may be integrated into one or more combined modules and/or submodules.

Exemplary Method(s)

Figure 3:
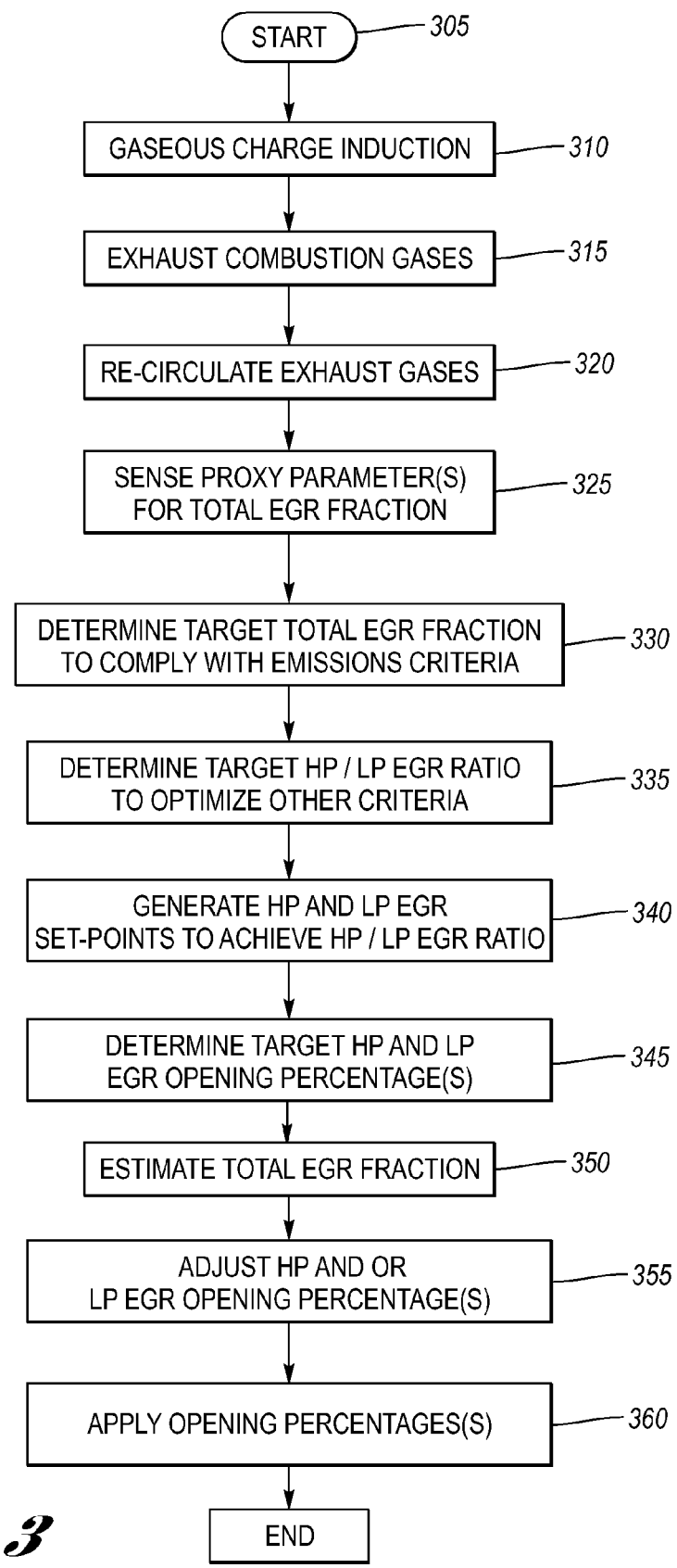
FIG. 3 is a flow chart of an exemplary method of EGR control that may be used with the engine system of FIG. 1.

A method of controlling LP and HP EGR is provided herein and may be carried out as one or more computer programs within the operating environment of the engine system 10 described above. Those skilled in the art will also recognize that the method may be carried out using other engine systems within other operating environments. Referring now to FIG. 3, an exemplary method 300 is illustrated in flow chart form.

As shown at step 305, the method 300 may be initiated in any suitable manner. For example, the method 300 may be initiated at startup of the engine 12 of the engine system 10 of FIG. 1.

At step 310, fresh air may be drawn into an induction subsystem of an engine system, and induction gases are inducted into an engine of the engine system through the induction subsystem. For example, fresh air may be drawn into the inlet 26 of the induction system 14, and induction gases may be inducted into the engine 12 through the intake manifold 34.

At step 315, exhaust gases may be exhausted from an engine through an exhaust subsystem of an engine system. For example, exhaust gases may be exhausted from the engine 12 through the exhaust manifold 36.

At step 320, exhaust gases may be recirculated from an exhaust subsystem through one or both of high or low pressure EGR paths to an induction subsystem of an engine system. For example, HP and LP exhaust gases may be recirculated from the exhaust subsystem 16, through the HP and LP EGR paths 46, 48, to the induction subsystem 14.

At step 325, one or more proxy parameters may be sensed that is/are indicative of total EGR fraction. For example, the proxy parameter(s) may include air mass flow, $O_2$, and/or engine system temperatures, and may be measured by respective sensors 60 of the engine system 10.

At step 330, a target total EGR fraction may be determined for compliance with exhaust emissions criteria. For example, the top level engine control module 62 may use any suitable engine system model(s) to cross-reference current engine operating parameters with desirable total EGR fraction values to comply with predetermined emissions standards. As used herein, the term "target" includes a single value, multiple values, and/or any range of values. Also, as used herein, the term "criteria" includes the singular and the plural. Examples of criteria used to determine appropriate EGR fraction(s) include calibrated tables based on speed and load, model based approaches which determine cylinder temperatures targets and convert to EGR fraction and operating conditions such as transient operation or steady state operation. Absolute emissions criteria may be dictated by environmental entities such as the U.S. Environmental Protection Agency (EPA).

At step 335, a target HP/LP EGR ratio may be determined to optimize one or more other engine system criteria such as fuel economy goals, engine system performance goals, or engine system protection or maintenance specifications, and as constrained by the target total EGR fraction determined in step 330. Those skilled in the art will appreciate that a target ratio may be determined by determining one, the other, or both of the constituents of the ratio. For example, the target HP/LP EGR ratio may be determined by determining the HP EGR percentage, the LP EGR percentage, or both. In any case, step 335 may be carried out in conjunction with FIGS. 11-15 and the accompanying description set forth herein below.

At step 340, individual HP EGR and/or LP EGR setpoints may be generated in accordance with the target HP/LP EGR ratio determined in step 335.

At step 345, target HP and LP EGR opening percentages corresponding to the HP and LP EGR setpoints may be determined. For example, open-loop controllers may process the HP and LP EGR setpoints and other engine system parameters using models to generate the opening percentages.

At step 350, total EGR fraction may be estimated responsive to the proxy parameter(s), which are used as input to any suitable engine system models as discussed previously above. For example, the total EGR fraction estimate may include engine system models to formulaically or empirically correlate the proxy parameter(s) to the total EGR fraction. The models may include lookup tables, maps, and the like, that may cross reference EGR fraction values with proxy parameter values, and may be based on engine speed and intake manifold pressure and temperature. In any case, the total EGR fraction is not actually directly measured using individual HP and/or LP EGR flow sensors or a combined total EGR flow sensor.

At step 355, one or both of the individual HP EGR and/or LP EGR fractions may be adjusted using closed-loop control with the estimated total EGR fraction. The HP and/or LP EGR fractions may be adjusted via closed-loop control of either or both of the respective HP and/or LP EGR setpoints or the valve and/or throttle opening percentages. For example, and as will be discussed in greater detail below, a closed-loop controller may process the estimated total EGR fraction as process variable input and the total EGR fraction setpoint as a setpoint input, in order to generate an HP and/or LP EGR setpoint output trim command. Thus, the target total EGR fraction preferably is closed-loop controlled by closed-loop adjustments to the HP and/or LP EGR fractions. Such adjustments may change the actual HP/LP EGR ratio.

At step 360, the HP EGR and LP EGR opening percentages from step 350 may be applied to one or more respective HP EGR, LP EGR, intake throttle, or exhaust throttle valves. The HP and/or LP EGR opening percentages are adjusted directly, downstream of the open-loop control blocks or indirectly via setpoint adjustment upstream of the open-loop control blocks.

Exemplary Control Flows

Referring now to the controls diagram of FIG. 4, a portion of the control method 300 from FIG. 3 is illustrated in block form as an EGR control flow 400. The control flow 400 may be carried out, for example, within the exemplary control subsystem of FIG. 2 and, more particularly, within the induction control module 64 thereof. Accordingly, FIG. 4 illustrates the HP and LP EGR control submodules or blocks 72, 74 and the turbocharger boost control submodule or block 76. Similarly, an optimization block 402, an EGR fraction estimator block 404, and an EGR fraction closed-loop control block 406 may also be carried out within the induction control module 64 and, more particularly, within the top level induction control submodule 70 of FIG. 2.

Figure 5A:
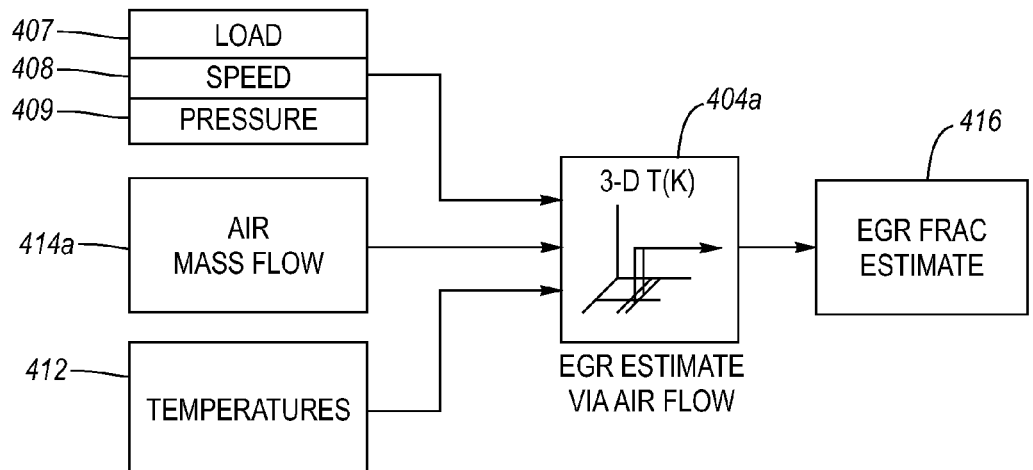
FIGS. 5A-5C illustrate exemplary embodiments of the estimation block of FIG. 4.
Figure 5B:
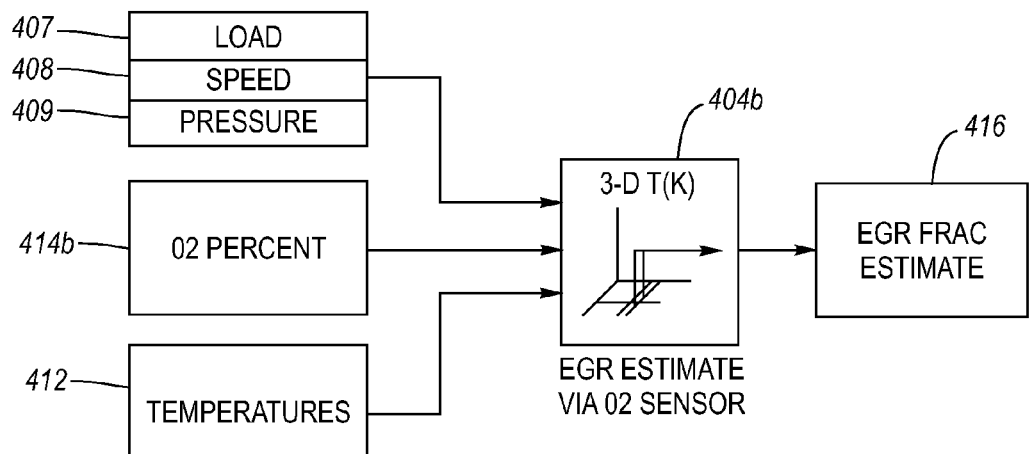
Figure 5C:
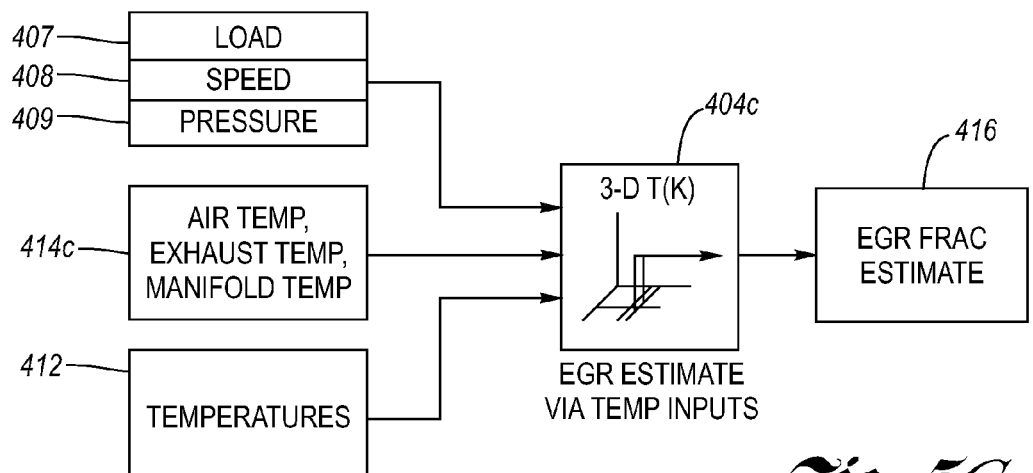

First, and referring also to FIGS. 5A-5C, the actual total EGR fraction estimator block 404 may be carried out using the proxy parameter(s) for the actual total EGR fraction in addition to other standard engine system parameters such as engine load, engine speed, turbocharger boost pressure, and/or engine system temperatures. For example, FIG. 5A illustrates that the proxy parameter may be air mass flow 414*a*, which may be obtained from any suitable air mass flow estimate or reading such as from the intake air mass flow sensor. In another example, FIG. 5B illustrates that the proxy parameter may be oxygen percentage 414*b*, such as from an $O_2$ sensor like the $O_2$ sensor disposed in the induction subsystem 14. For instance, the $O_2$ sensor may be a universal exhaust gas oxygen sensor (UEGO), which may be located in the intake manifold 34. In a further example, FIG. 5C illustrates that the proxy parameter may be induction subsystem and exhaust subsystem temperature 414*c* taken from temperature sensors. For instance, inlet air temperature may be used such as from the air inlet temperature sensor, exhaust temperature such as from the exhaust temperature sensor, and manifold temperature such as from the intake manifold temperature sensor. In all of the above-approaches, the actual total EGR fraction 416 may be estimated from one or more proxy parameter types.

Second, and referring again to FIG. 4, the optimization block 402 may receive and process various engine system inputs to identify an optimal HP/LP EGR ratio and generate an HP EGR setpoint according to that ratio. For example, the optimization block 402 may receive the engine load signal 407 and the engine speed signal 408, such as from corresponding sensors in the engine system 10. The engine load signal 407 may include any parameters such as manifold pressure, fuel injection flow, etc. The optimization block 402 may also receive a total EGR fraction setpoint 418 such as from the top level engine control module 62. The optimization block 402 may be carried out in conjunction with FIGS. 11-15 and the accompanying description set forth herein below.

The optimization block 402 may prioritize fuel economy criteria for identifying the optimal HP/LP EGR ratio and generating the corresponding HP EGR setpoint. According to fuel economy optimization, the optimization block 402 may include any suitable net turbocharger efficiency model that encompasses various parameters such as pumping losses, and turbine and compressor efficiencies. The efficiency model may include a principles based mathematical representation of the engine induction subsystem 14, a set of engine system calibration tables, or the like. Example criteria used to determine desired EGR ratios to meet fuel economy criteria may include setting a ratio that allows the total EGR fraction to be achieved without the need for closing the intake or exhaust throttles, which closing tends to negatively impact fuel economy, or the ratio may be adjusted to achieve an optimal induction temperature for maximum fuel economy.

The optimization block 402 may also override the fuel economy criteria to instead optimize other engine system criteria for any suitable purpose. For example, the fuel economy criteria may be overridden to provide an HP/LP EGR ratio that provides improved engine system performance, such as increased torque output in response to driver demand for vehicle acceleration. In this case, the controller may favor a higher percentage of LP EGR which allows better turbocharger speed-up to reduce turbo lag. In another example, the override may provide a different HP/LP EGR ratio to protect the engine system 10 such as to avoid a turbocharger overspeed condition or excess compressor tip temperatures, or to reduce turbocharger condensate formation, or the like. In a further example, the override may provide another HP/LP EGR ratio to maintain the engine system 10 such as by affecting induction or exhaust subsystem temperatures. For instance, exhaust subsystem temperatures may be increased to regenerate a diesel particulate filter, and induction temperatures may be reduced to cool the engine 12. As a further example, induction temperature may be controlled to reduce the potential for water condensate to form in the inlet induction path.

In any case, the optimization block 402 processes the inputs in accordance with its model(s) to determine the target HP/LP EGR ratio and then generate an HP EGR setpoint 420, which is fed downstream to the HP EGR control block 74 and to an arithmetic node 422, which also receives the total EGR fraction setpoint 418 from the top level engine control module 62 to yield an LP EGR setpoint 424.

Third, and still referring to FIG. 4, the total EGR fraction closed-loop control block 406 may be any suitable closed-loop control means, such as a PID controller block or the like, for controlling the total EGR fraction. The closed-loop control block 406 includes a setpoint input 406*a* to receive the target total EGR fraction setpoint from the top level engine control module 62 and further may include a process variable input 406*b* to receive the actual total EGR fraction estimate from the estimator block 404. The total EGR fraction control block 406 may process these inputs to generate a feedback control signal or trim command 406*c* for summation at another arithmetic node 426 with the LP EGR setpoint 424 for input downstream at the LP EGR control block 72. Such trim adjustment may also or instead be calculated as an adjustment to the LP EGR valve and/or exhaust throttle valve percentage opening command(s) and added after the LP EGR open-loop control block 72. Accordingly, the control block 406 and associate nodes would be communicated to the open-loop control block 72 at a downstream side thereof to adjust suitable setpoints for the valve and throttle opening percentages.

Because the HP EGR flow may only be open-loop controlled, the LP EGR flow or fraction may be adjusted by the closed-loop control block 406 to achieve the target total EGR fraction. More specifically, because exhaust emissions and engine fuel economy are both highly dependent on total EGR fraction and to a lesser extent on the HP/LP EGR ratio, the total EGR fraction may be closed-loop controlled for maximum control whereas the HP and/or LP EGR fractions and/or the HP/LP EGR ratio may be at least partially open-loop controlled for maximum cost-effectiveness and efficiency. These open-loop control blocks 72, 74 provide good response time, reduce controller interdependencies, and reduce the effects of transients and disturbances in sensor signals. While this is one exemplary approach, other approaches are discussed below in reference to FIGS. 8-10.

Fourth, the LP and HP EGR control blocks 72, 74 may receive their respective LP and HP EGR setpoints in addition to the turbocharger boost pressure 409 and the engine load and speed inputs 407, 408. The LP and HP EGR control blocks 72, 74 may receive such inputs for open-loop or feed-forward control of their respective LP and HP EGR actuators. For instance, the LP and HP EGR control blocks 72, 74 may output LP EGR valve and/or exhaust throttle commands 430, 432, and HP EGR valve and/or intake throttle commands 438, 440. The LP and HP EGR control blocks 72, 74 may correlate HP and LP EGR flow to suitable HP and LP EGR valve and/or throttle positions using one or more models.

Figure 6A:
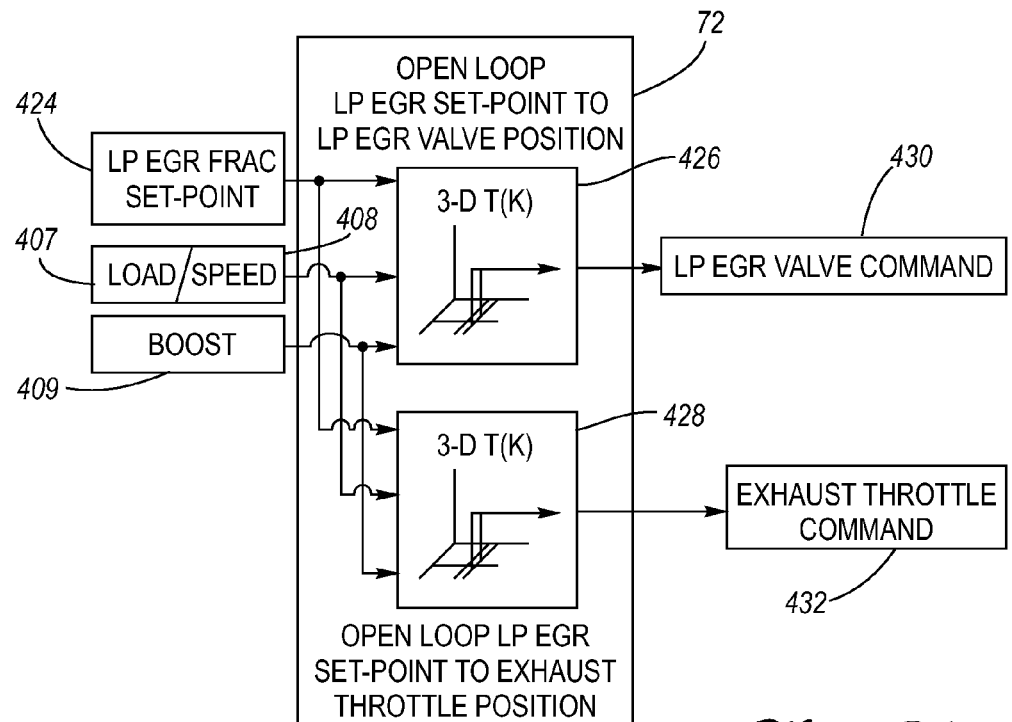
FIGS. 6A-6B illustrate exemplary embodiments of the high and low pressure EGR open-loop control blocks of FIG. 4.
Figure 6B:
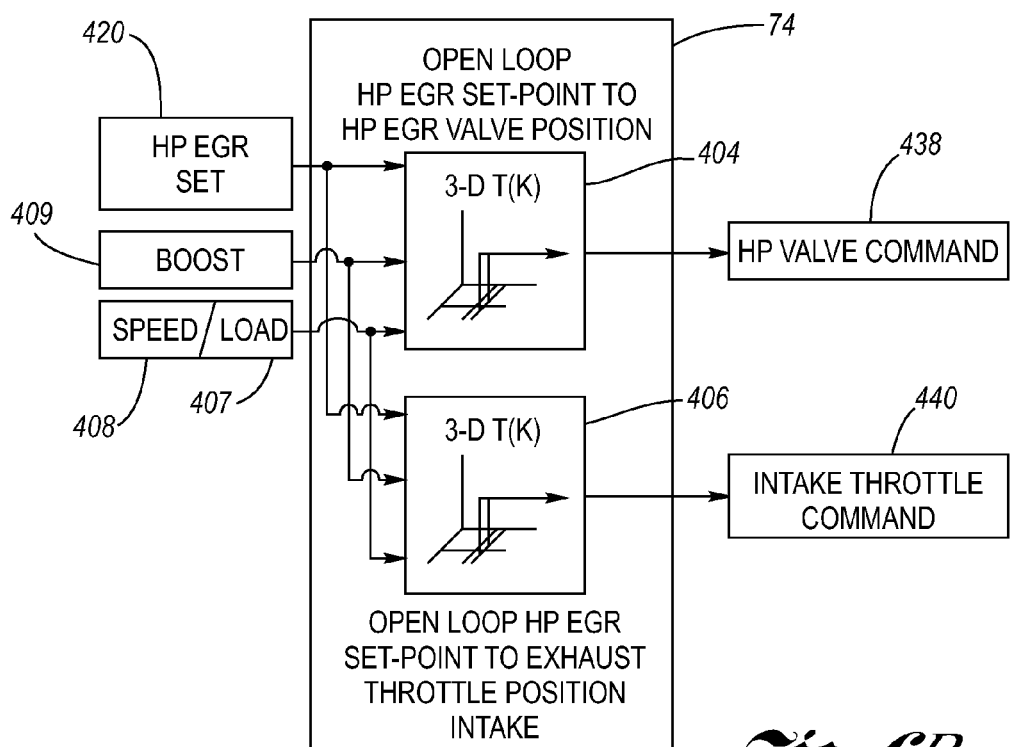

As shown in FIGS. 6A and 6B, the LP and HP EGR control blocks 72, 74 may include various open-loop control models. For instance, the LP EGR control block 72 may include any suitable model(s) 426 to correlate the LP EGR setpoint 424 to the LP EGR valve position to help achieve the target HP/LP EGR ratio. Also, the LP EGR control block 72 may include any suitable model(s) 428 to correlate the LP EGR setpoint 424 to the exhaust throttle position to help achieve the target HP/LP EGR ratio. The models 426, 428 may receive any suitable inputs such as the engine load 407, the engine speed 408, and the turbocharger boost pressure 409. The models 426, 428 may be executed to generate, respectively, the LP EGR valve command 430 and/or the exhaust throttle command 432 for use by respective actuators. Note that the actuators may operate in an open loop mode, or may be operatively coupled with any suitable sensors to measure actuator position and adjust the commands to achieve the target percentages.

Likewise, the HP EGR control block 74 may include any suitable model(s) 434 to correlate the HP EGR setpoint 420 to the HP EGR valve position to help achieve the target HP/LP EGR ratio. Also, the HP EGR control block 74 may include any suitable model(s) 436 to correlate the HP EGR setpoint 420 to the intake throttle position to help achieve the target HP/LP EGR ratio. Again, the models 434, 436 may receive any suitable inputs such as the engine load 407, the engine speed 408, and the turbocharger boost pressure 409. The models 434, 436 are executed to generate, respectively, an HP EGR valve command 438 and/or an intake throttle command 440 for use by respective actuators.

Figure 7:
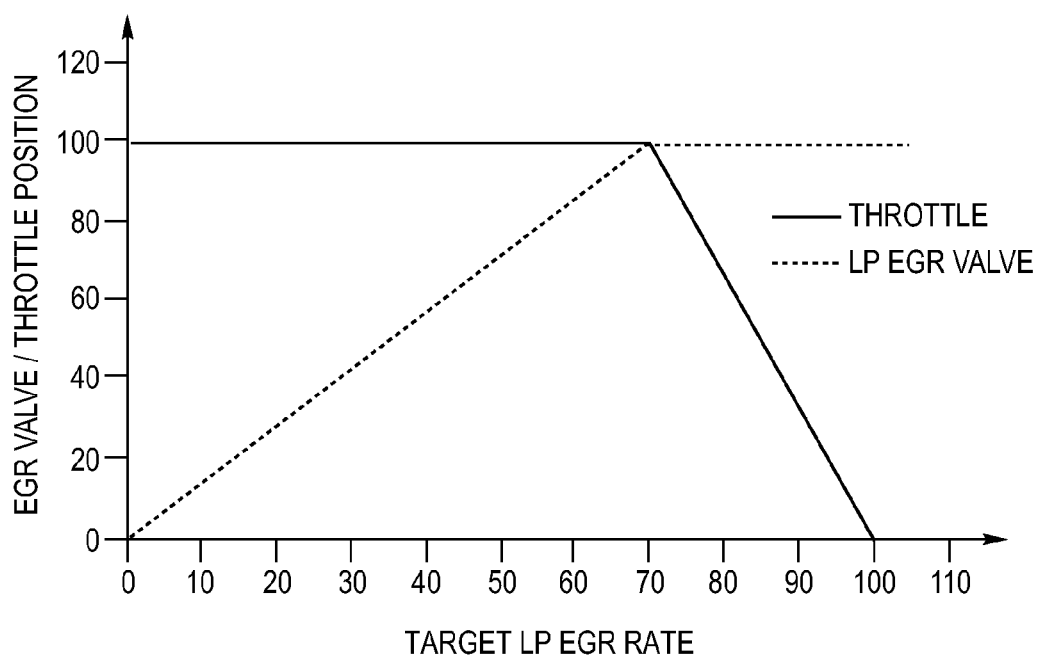
FIG. 7 is a graph illustrating an exemplary plot of valve position versus target total EGR fraction.

FIG. 7 illustrates a graph of exemplary LP EGR valve and exhaust throttle opening percentages vs. target total EGR fraction. As shown, the throttle valve 42 may be substantially 100% open at about 0% EGR and stays open until about 70% EGR. The LP EGR valve 54 gradually opens from about 0% EGR to about 70% EGR and thereafter is substantially 100% open. A single, combined, LP EGR and exhaust throttle valve could be used instead of two separate valves as long as such a unitary valve device could substantially achieve the valve openings just described.

Referring again to FIG. 4, the turbocharger boost control block 76 may be any suitable closed-loop control means, such as suitable PM control block, for adjusting turbocharger actuators to achieve a target boost pressure within safe turbo operating boundaries. The control block 76 may include a setpoint input 76a to receive boost setpoint 442 from the top level engine control module 62, and an actual boost pressure input 76b from the turbocharger boost sensor. The control block 76 may process these inputs and generate any suitable turbocharger command output such as a variable turbine geometry command 444 to adjust variable vanes of the turbocharger 18.

Figure 8:
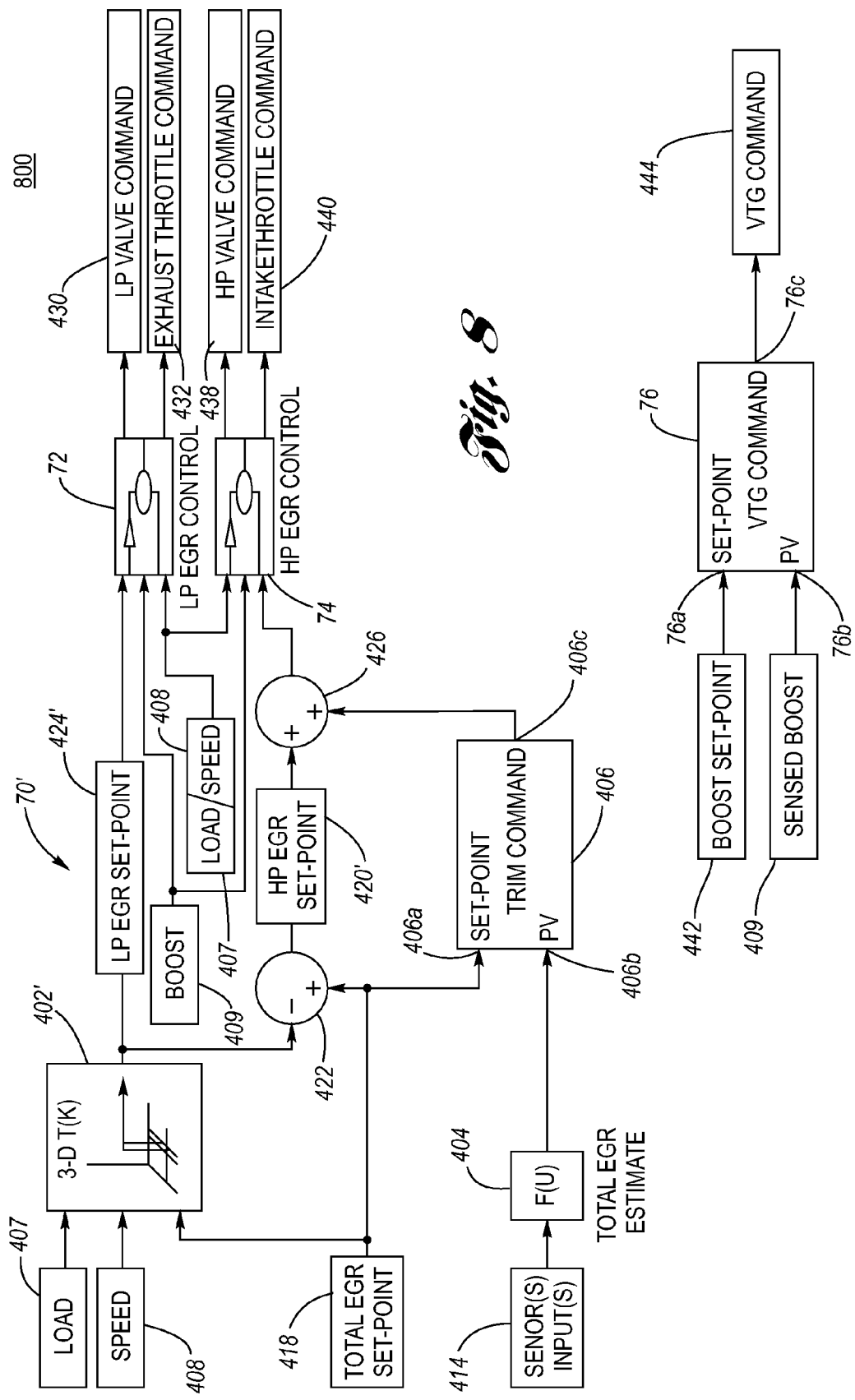
FIG. 8 is a block diagram illustrating a second control flow portion of the method of FIG. 3.

Referring now to FIG. 8, an alternative control flow 800 may be used in place of the preferred control flow 400. This embodiment is similar in many respects to the embodiment of FIG. 4, and like numerals between the embodiments generally designate like or corresponding elements throughout the several views of the drawing figures. Additionally, the description of the previous embodiment is incorporated by reference and the common subject matter may generally not be repeated here.

The alternative control flow 800 may involve closed-loop adjustment of HP EGR instead of LP EGR. In other words, an HP EGR setpoint 420'—instead of an LP EGR setpoint 424'—may be adjusted to control the total EGR fraction. Accordingly, the closed-loop control block 406 may generate a control signal to adjust the HP EGR fraction—instead of the LP EGR fraction. To accommodate this change in control strategy, an optimization block 402' may be provided to output an LP EGR setpoint 424' instead of the HP EGR setpoint 420. Such trim adjustment may also or instead be calculated as an adjustment to the HP EGR valve and/or intake throttle valve percentage opening command(s) and added after the HP EGR open-loop control block 74. Accordingly, the control block 406 and associate nodes would be communicated to the open-loop control block 74 at a downstream side thereof to adjust suitable setpoints for the valve and throttle opening percentages. Otherwise, the flow 800 is substantially similar to flow 400.

Figure 9:
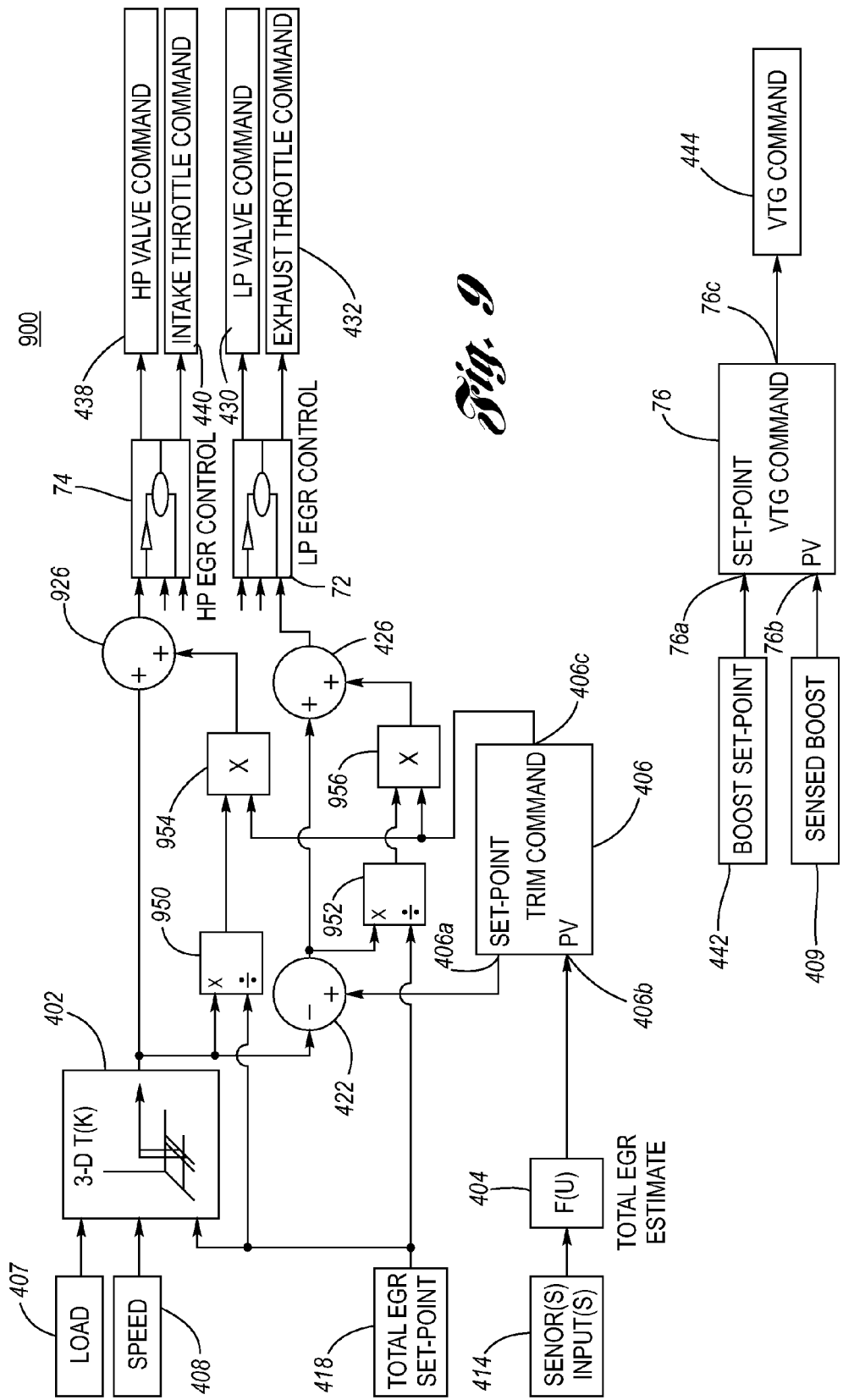
FIG. 9 a block diagram illustrating a third control flow portion of the method of FIG. 3.

Referring now to FIG. 9, a second control flow 900 may be used in place of the preferred control flow 400. This embodiment is similar in many respects to the embodiment of FIG. 4, and like numerals between the embodiments generally designate like or corresponding elements throughout the several views of the drawing figures. Additionally, the description of the previous embodiment is incorporated by reference and the common subject matter may generally not be repeated here.

In the second control flow 900, closed-loop control may be allocated to HP and LP EGR fractions in the same proportion as the HP and LP EGR setpoints. In other words, HP and LP EGR fractions are both closed-loop adjusted in proportion to their respective HP and LP EGR setpoints.

To facilitate this change in control strategy, the closed-loop control block 406 may not output its trim command 406c only to the LP EGR control block 72 via the upstream arithmetic node 426 as in flow 400. Rather, the trim command may be output to both the LP and HP EGR control blocks 72, 74. To further facilitate this change, proportional arithmetic blocks 950, 952 may receive respective HP and LP EGR setpoints and the total EGR setpoint 418. The proportional output from the arithmetic blocks 950, 952 may be received at multiplication arithmetic blocks 954, 956 for proportional allocation of the closed-loop trim command 406c thereto. The multiplication outputs are summed at downstream arithmetic nodes 426, 926 with the LP and HP EGR setpoints for input downstream at the LP and HP EGR control blocks 72, 74. Suitable checks may be implemented within the arithmetic blocks to avoid dividing by 0 when the total EGR fraction set-point is 0. Otherwise the flow 900 is substantially similar to that in flows 400 and/or 800.

Figure 10:
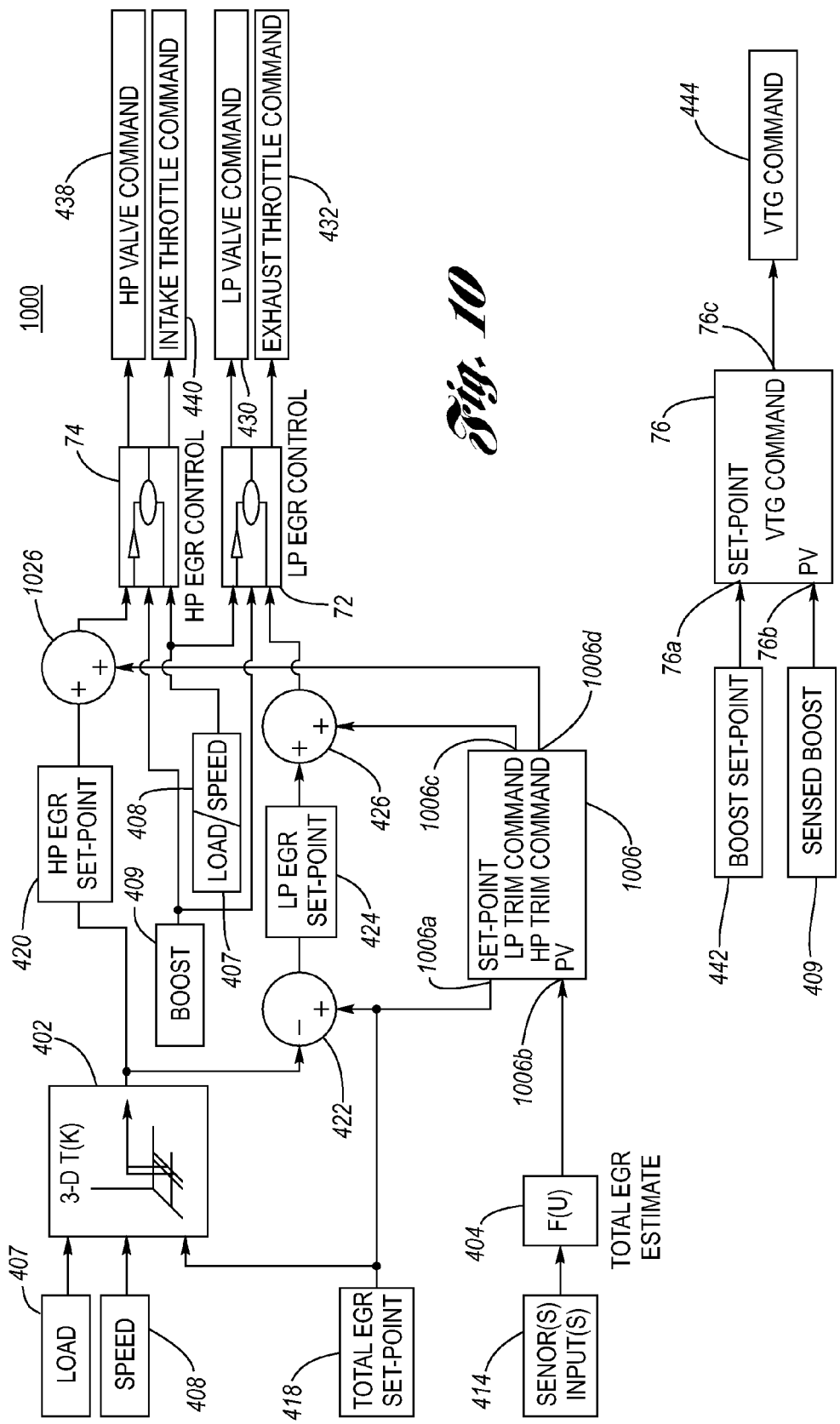
FIG. 10 is a block diagram illustrating a fourth control flow portion of the method of FIG. 3.

Referring now to FIG. 10, a third exemplary control flow 1000 may be used in place of the preferred control flow 400. This embodiment is similar in many respects to the embodiment of FIG. 4, and like numerals between the embodiments generally designate like or corresponding elements throughout the several views of the drawing figures. Additionally, the description of the previous embodiment is incorporated by reference and the common subject matter may generally not be repeated here.

In the third control flow 1000, closed-loop control may be switched back and forth between the LP and HP EGR open-loop control blocks 72, 74 depending on engine operating conditions at any given moment. In other words, either HP or LP EGR setpoints may be adjusted with closed-loop control. For example, HP EGR may be closed-loop controlled to avoid turbocharger condensation when engine system temperatures are relatively high, or when a rapid change in total EGR fraction is required, or when the turbocharger performance is less important or not required.

To accomplish the change in control strategy, a closed-loop control block 1006 may not provide output only to the LP EGR control block 72 via the upstream arithmetic node 426 as in flow 400. Rather, the control block 1006 may provide output to both the LP and HP EGR control blocks 72, 74. The closed-loop control block 1006 may include a setpoint input 1006a to receive the target total EGR fraction setpoint 418 from the top level engine control module 62 and further may include a process variable input 1006b to receive the actual total EGR fraction estimate from the estimator block 404. The total EGR fraction control block 1006 may process these inputs to generate alternative trim commands, an LP EGR trim command 1006c for summation at arithmetic node 426 with the LP EGR setpoint 424 for input downstream at the LP EGR control block 72. and an HP EGR trim command 1006d for summation at another arithmetic node 1026 with the HP EGR setpoint 420 for input downstream at the HP EGR control block 74. The control block 1006 may be switched between the two outputs 1006c, 1006d such that the LP EGR fraction or the HP EGR fraction may be adjusted by the closed-loop control block 1006 to achieve the target total EGR fraction. Otherwise, the flow 1000 is substantially similar to that in flows 400 and/or 800.

One or more of the various illustrative embodiments above may include one or more of the following advantages. First, a total target EGR fraction may be allocated to HP and LP EGR paths in a manner to first comply with emissions regulations, and then to optimize engine fuel economy and performance and protect and maintain an engine system. Second, use of individual total EGR, HP EGR, or LP EGR flow sensors is not required, which sensors are costly, complicate an engine system, and introduce failure modes. Third, one standard closed-loop control means may be used to control a target total EGR fraction as well as the individual HP and LP EGR flows, thereby allowing practical and cost-effective implementation in current engine control architectures. Fourth, a combined LP EGR valve and exhaust throttle valve controlled by a single common actuator may be used and, likewise, a combined HP EGR valve and intake throttle valve controlled by a single common actuator may also be used.

HP/LP EGR Ratio Optimization

Figure 11:
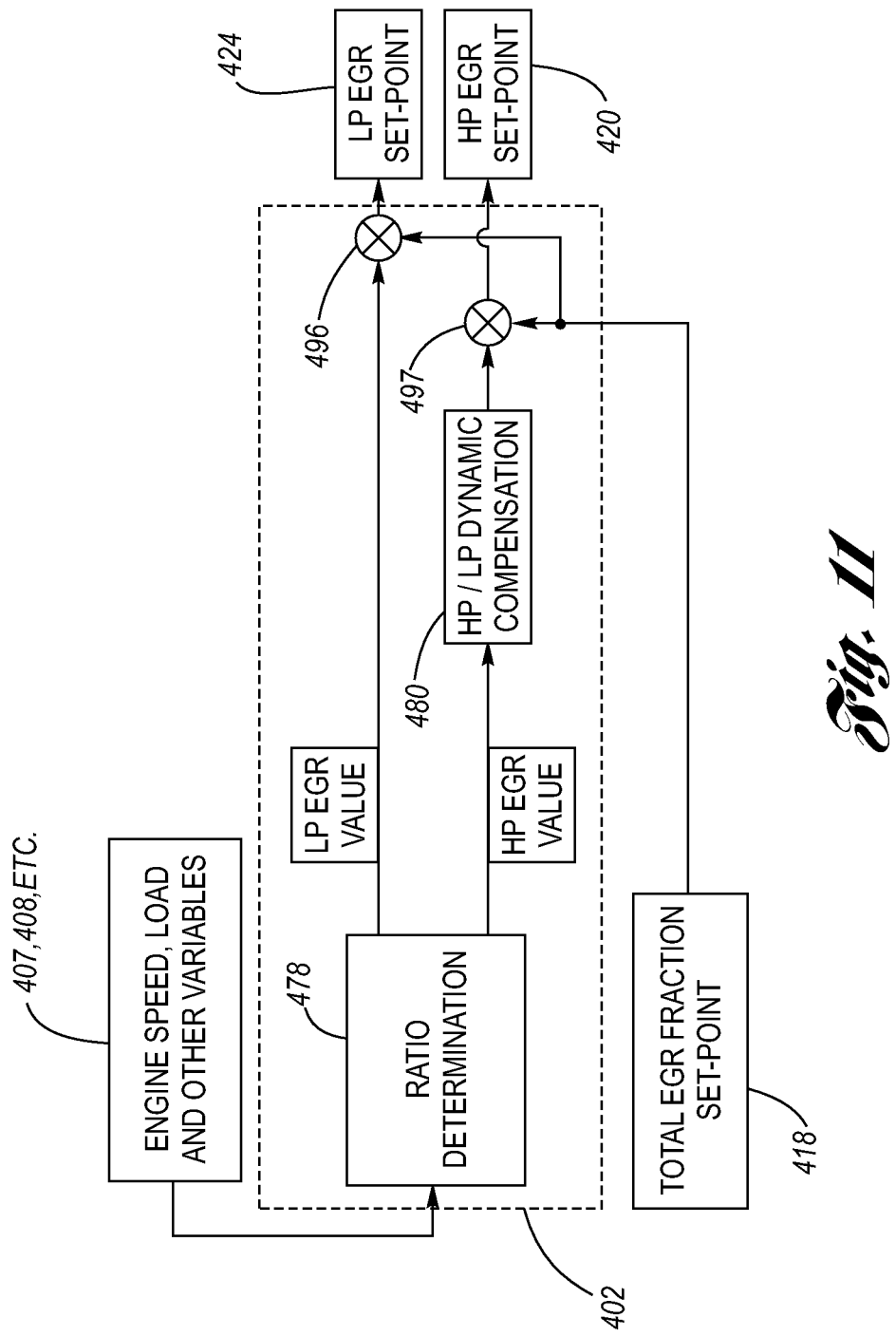
FIG. 11 is a block diagram of an exemplary control flow portion of HP/LP EGR ratio optimization and including an HP/LP EGR ratio determination block and an HP/LP EGR compensation block.

FIGS. 11 through 15B illustrate HP/LP EGR ratio optimization within a method of controlling exhaust gas recirculation (EGR) in a turbocharged compression-ignition engine system including a high pressure (HP) EGR path and a low pressure (LP) EGR path. Referring to FIGS. 4 and 11, the optimization block 402 may receive and process various engine system inputs, such as engine speed, engine load, and/or total EGR fraction setpoint, to identify and/or adjust an optimal HP/LP EGR ratio and generate HP and LP EGR setpoints according to that identified and/or adjusted ratio. For example, at any given moment in time during steady-state system operation, the sum of the LP and HP EGR setpoints may correspond to the total EGR fraction setpoint. More specifically, if the total EGR fraction setpoint is 35%, then the HP EGR setpoint may be 25% and the LP EGR setpoint may be 10% for a 2.5:1 ratio of HP to LP EGR. The optimization block 402 may prioritize among several different system objectives or criteria, including turbocharger protection, exhaust emissions, fuel economy, and engine performance. More specifically, the optimization block 402 may prioritize those criteria in the order listed above according to decreasing priority.

As shown in FIG. 11, the optimization block 402 may include a ratio determination block 478 that receives system inputs such as engine speed and load 407, 408 and determines an HP/LP EGR ratio based on the inputs. The optimization block may also include an HP/LP EGR ratio dynamic compensation block 480 to correct for lag time in EGR responsiveness, and arithmetic nodes 496, 497 downstream of the blocks 478, 480 to generate LP and HP EGR setpoints. The optimization block 402 may also include any other suitable blocks, arithmetic nodes, or the like.

The ratio determination block 478 may determine the percentage of the total EGR fraction setpoint that will be allocated to LP EGR and to HP EGR. Because LP and HP EGR are the only two sources of EGR, their percentage contributions add up to 100% at least during steady-state system operation. For example, during cold engine operation, the ratio determination block 478 may allocate only about 10% of the total EGR fraction to LP EGR and about 90% of the total EGR fraction to HP EGR, which is normally warmer than LP EGR, so as to more quickly warm up the engine. During other modes of operation, the ratio determination block 478 may allocate the total EGR fraction according to any other HP/LP EGR ratios such as 50/50, 20/80, etc.

Figure 12:
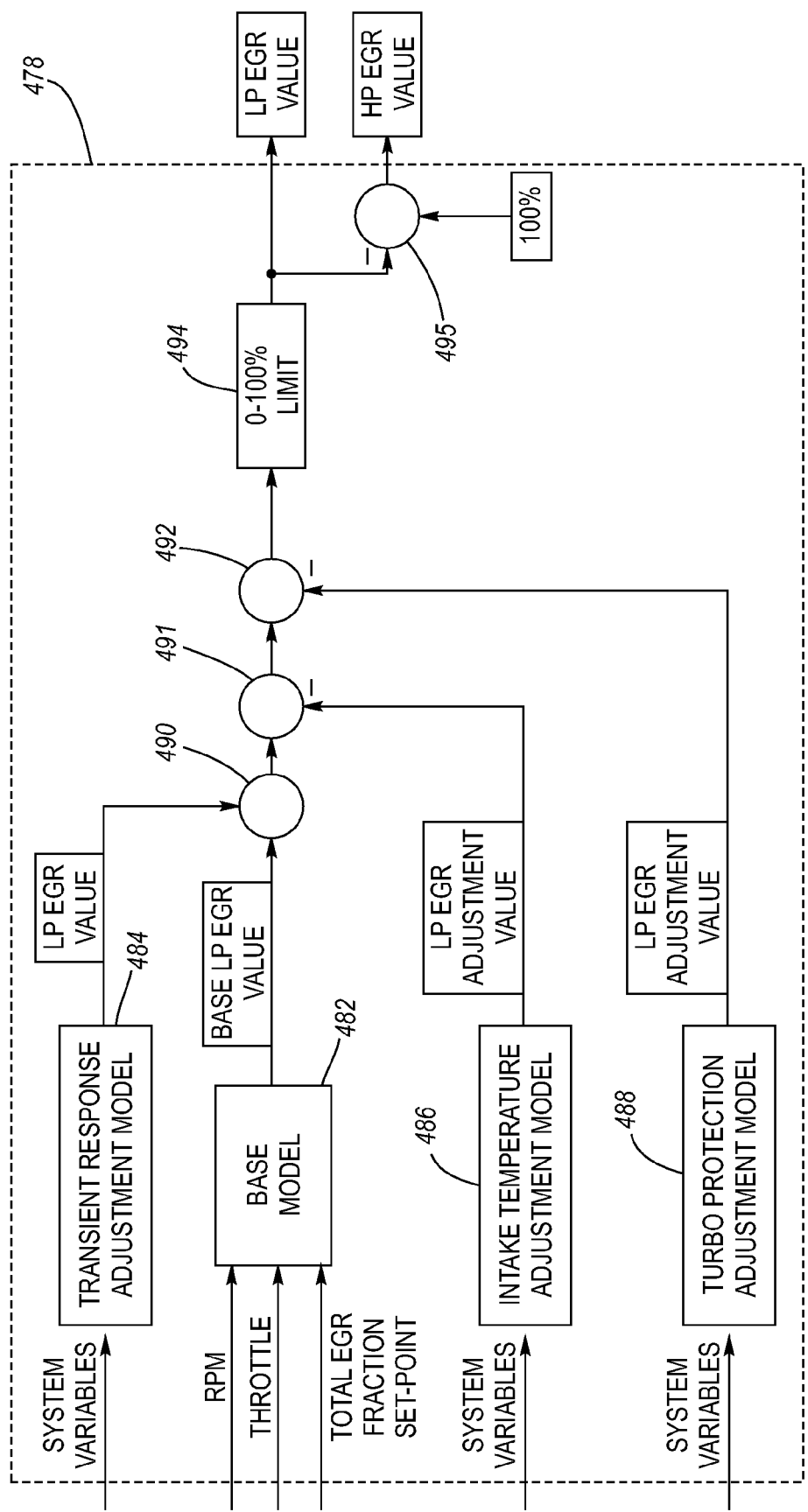
FIG. 12 is a block diagram of an exemplary control flow portion of the HP/LP EGR ratio determination block of FIG. 11.

Referring now to FIG. 12, the ratio determination block 478 may include several models, including a base model 482, which may be a model based on steady state system operating conditions. The base model 482 may receive signals or values corresponding to various system operating conditions, such as engine speed and engine load, and total EGR information such as total EGR setpoint. As used herein, the term "signal" includes electrical or electronic signals from sensors, values from memory, or the like. Actual parameter values may be measured from a directly corresponding parameter sensor, or may be estimated from measurements from other parameter sensors or from models, and/or the like. The base model 482 may process such input using one or more formulas, tables, maps, or the like to generate a base EGR value, such as a base HP/LP EGR ratio value, a base LP EGR value indicative of a base LP EGR contribution percentage, and/or a base HP EGR value indicative of a base HP EGR contribution percentage.

The base model 482 may be developed for steady state warm engine operating conditions and may include one or more objectives. For example, one objective may include maximization of fuel economy based on providing optimal flow of air and exhaust through a turbocharger. Another objective, such as during high engine loading, may include routing adequate amounts of exhaust gas through a turbocharger turbine so that sufficient intake manifold pressures are achieved to produce engine peak power and torque.

Although the base model 482 may receive signals indicative of any system operating conditions, preferably a limited set of signals is received, such as those mentioned above. This enables the base model 482 to be relatively simple and, thus, relatively reliable in comparison to models that include more variables, and more complexities due to the interactions of so many variables. For example, the model 482 may also include other variables including turbocharger speed, turbocharger temperature(s), turbocharger boost pressure, engine coolant temperature(s), induction temperature, etc. Preferably, however, such variables may be used in adjustment models of the ratio determination block 478, such as a transient load adjustment model 484, an induction temperature adjustment model 486, and a turbocharger protection adjustment model 488. The adjustment models 484, 486, 488 may output adjustment values, which may modify or adjust the base EGR value from the base model 482. For example, the adjustment models may output an adjustment HP/LP EGR ratio value, an adjustment LP EGR value indicative of an adjustment to LP EGR contribution percentage, and/or an adjustment HP EGR value indicative of an adjustment to HP EGR contribution percentage Referring now to FIG. 13, the transient load adjustment model 484 may be provided to improve a rate at which combustion gases (air and/or EGR gases) may be delivered to the engine, such as during engine acceleration. Because the amount of power and torque a diesel engine can deliver during transient operation is normally limited by the air available to the engine, improving the air delivery response leads to better engine power or acceleration responsiveness. A turbocharger is usually the primary means used to vary the delivery of air to an engine such as via wastegate valve adjustments, turbine or compressor vane adjustments, or the like. But the principal factor affecting the amount of air the turbocharger compressor can pump into the engine is the amount of energy in the form of gas flow, temperature, and pressure contained in the exhaust gas flowing through the turbocharger turbine. Because HP EGR does not power a turbocharger turbine whereas LP EGR does, this adjustment model 484 may produce a positive adjustment to the LP EGR value, for example, when it is determined that a target boost pressure (engine air) is higher than the actual air being delivered to the engine.

Figure 13:
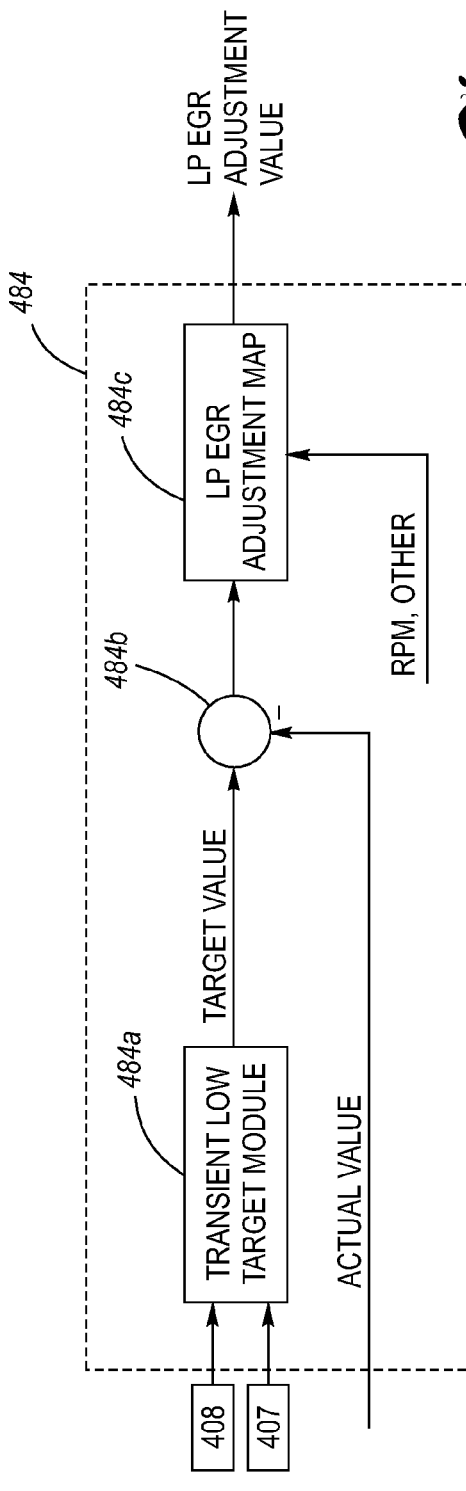
FIG. 13 is a block diagram of an exemplary control flow portion of a transient load adjustment model of the HP/LP EGR ratio determination block of FIG. 11.

Still referring to FIG. 13, the adjustment model 484 may include a target load response model 484a for determining a target turbocharger boost pressure and/or a target induction flow value, an arithmetic node 484b for comparing such target value(s) with an actual turbocharger boost pressure or induction flow value, and a turbocharger boost pressure and/or induction flow adjustment model 484c for determining an LP EGR adjustment value based on the variance between the target and actual boost or induction value(s). The target load response model 484a may be any formula, lookup table, map, or the like that receives system operating condition input such as engine load 407, or engine speed 408, or the like, and that process such input to output a corresponding target boost or induction flow value to the arithmetic node 484b. The arithmetic node 484b may be a subtraction node that subtracts an actual boost pressure or induction flow value and passes along a differential value to the adjustment model 484c when target boost pressure or induction flow is greater than the actual boost pressure or induction flow. The adjustment model 484c may receive the differential value and any other suitable system parameters and process such data with one or more formulas, maps, tables, or the like to generate a first LP EGR adjustment value. Accordingly, the HP and LP EGR values may be modulated toward greater LP EGR to allow boost pressure to build more quickly.

Figure 14:
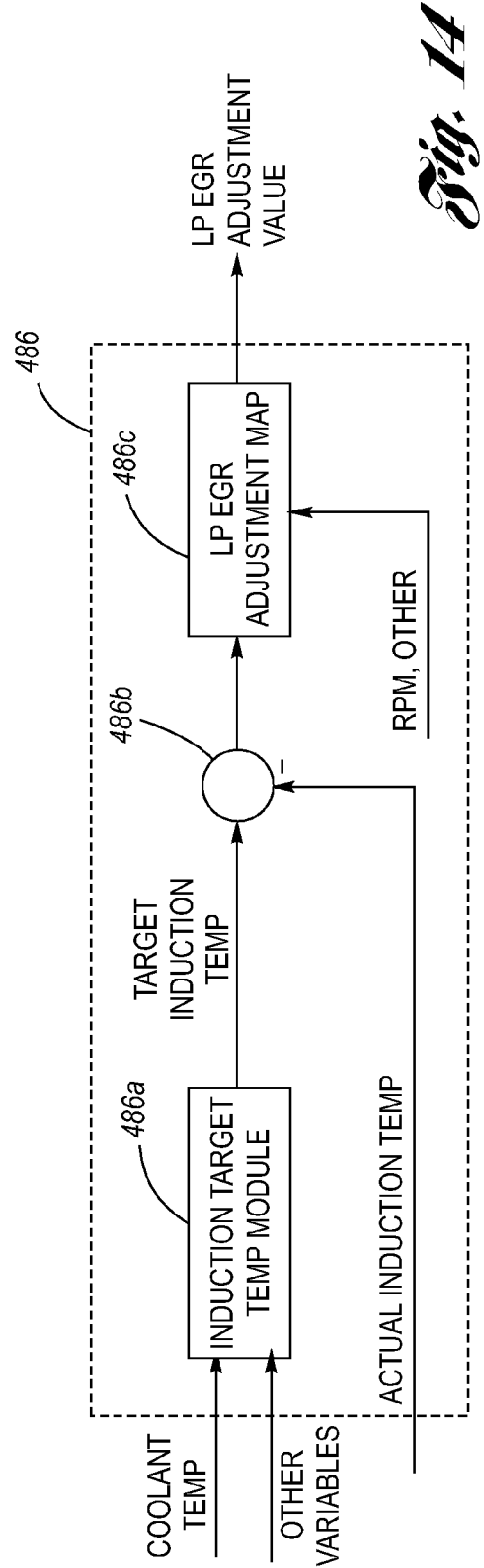
FIG. 14 is a block diagram of an exemplary control flow portion of an induction temperature adjustment model of the HP/LP EGR ratio determination block of FIG. 11.

Referring now to FIG. 14, the induction temperature adjustment model 486 may be provided to modify induction temperatures by varying the HP/LP EGR ratio. This objective is usually relatively easy to obtain because the HP EGR temperature is usually significantly higher than the LP EGR temperature. The adjustment model 486 may include a target induction temperature model 486a for determining a target induction temperature value, an arithmetic node 486b for comparing the target value with an actual induction temperature value, and an LP EGR adjustment model 486c for determining an LP EGR adjustment value based on the variance between the target and actual values. The target induction temperature model 486a may be any formula, lookup table, map, or the like that receives system operating condition input such as engine coolant temperature, or the like, and that may be processed with such input to output a corresponding preferred induction temperature value to the arithmetic node 486b. The arithmetic node 486b may be a subtraction node that subtracts the actual induction temperature value and passes along a differential value to the adjustment model 486a when target induction temperature is greater than the actual induction temperature. The adjustment model 486a receives the differential value and any other suitable system parameters and may be processed with such data with one or more formulas, maps, tables, or the like to generate a second LP EGR adjustment value.

The adjustment model 486 may also control induction temperature at different points in an induction sub-system. For example, it may be desirable to control induction temperature where LP EGR mixes with intake air upstream of a turbocharger compressor. This may be especially true during operating conditions wherein harmful condensate can arise if LP EGR temperature is too low. In a particular example, U.S. Provisional Application No. 60/748,894, filed Dec. 9, 2005, discloses a strategy to calculate when harmful condensate occurs and to control an LP EGR bypass valve to avoid such conditions. The aforementioned patent application is assigned to the assignee hereof and is hereby incorporated by reference herein in its entirety. The adjustment model 486 may use the same calculations from the aforementioned patent application to adjust the HP/LP EGR ratio instead of or in addition to controlling the LP EGR bypass valve. Accordingly, the HP and LP EGR values may be modulated to avoid condensate in EGR coolers and/or in a turbocharger compressor, and to provide warmer induction gases to an engine.

Figure 15A:
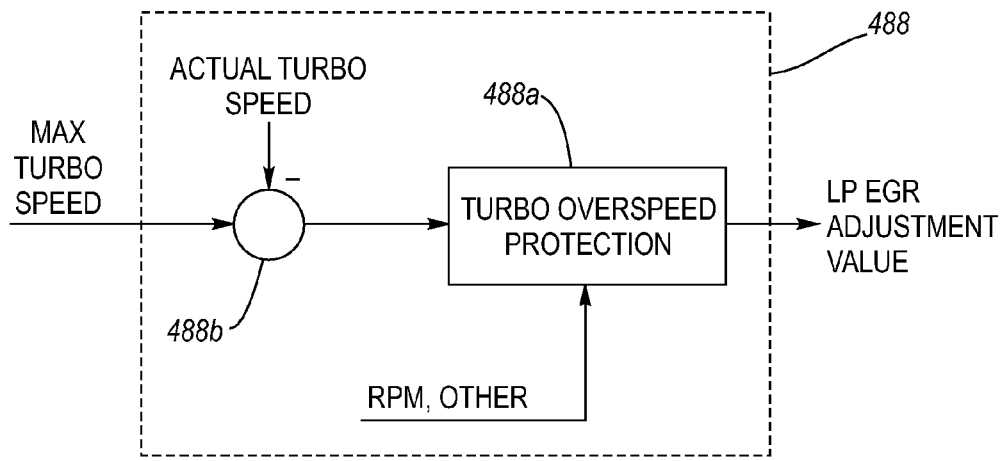
FIGS. 15A and 15B are block diagrams of exemplary control flow portions of a turbocharger protection adjustment model of the HP/LP EGR ratio determination block of FIG. 11.

Referring now to FIG. 15A, the turbocharger protection adjustment model 488 may be provided to protect the turbocharger against overspeed and excessive temperatures. For example, the adjustment model 488 may include a turbocharger overspeed protection model 488a that adjusts LP EGR to avoid damage to the turbocharger. The overspeed protection model 488a may receive a differential value from an arithmetic node 488b, which may receive and compare a maximum turbocharger speed signal and an actual turbocharger speed signal. The arithmetic node 488b may be a subtraction node, wherein the actual turbocharger speed signal may be subtracted from the maximum turbocharger speed signal to yield the differential value sent to the protection model 488a. The maximum turbocharger speed signal may come from memory in a top level engine control module or any other suitable location, or from some other model, or the like. The actual turbocharger speed signal may come from a turbocharger speed sensor or any other suitable speed sensor, or from a top level engine control module or elsewhere. The protection model 488a may receive the differential value from the arithmetic node 488*b* and any other suitable system parameters such as engine speed, and may be processed with such data to generate a third LP EGR adjustment, for example to reduce the speed of a turbocharger.

Figure 15B:
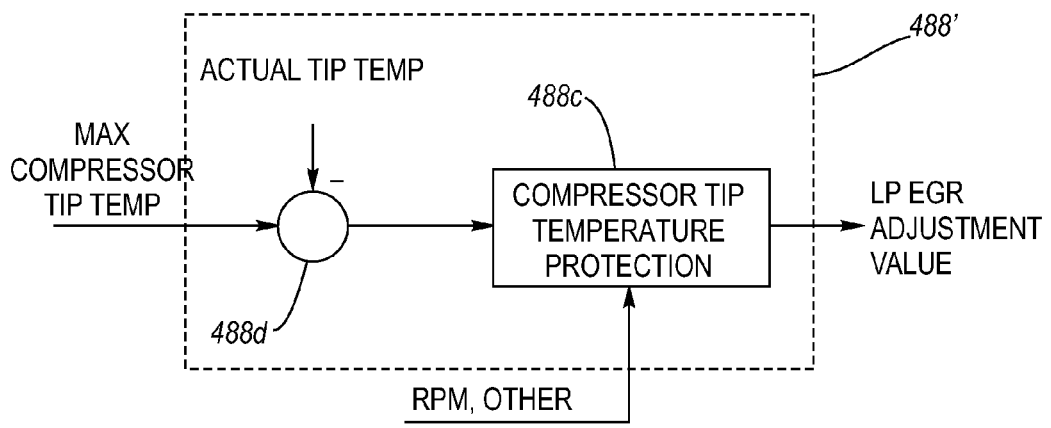

In another example, and referring now to FIG. 15B, an alternative adjustment model 488' may include a turbocharger compressor tip protection model 488*c* that may adjust LP EGR to avoid damage to the turbocharger compressor. The compressor tip protection model 488*c* may receive a differential value from another arithmetic node 488*d*, which may receive a maximum compressor tip temperature signal and an actual compressor tip temperature signal. The arithmetic node 488*d* may be a subtraction node, wherein the actual compressor tip temperature signal may be subtracted from the maximum compressor tip temperature signal to yield the differential value sent to the tip protection model 488*c*. The maximum compressor tip temperature signal may come from memory in a top level engine control module or any other suitable location, or from some other model, or the like. The actual compressor tip temperature signal may come from a compressor temperature sensor or any other suitable temperature sensor, or from a top level engine control module or elsewhere. The tip protection model 488*c* may receive the differential value from the arithmetic node 488*d* and any other suitable system parameters such as engine speed, and may be processed with such data to generate an alternative third LP EGR adjustment value, for example to reduce the compressor tip temperature. Accordingly, the HP and LP EGR values can be modulated to avoid excessive system temperatures and speeds in a turbocharger.

Any other ratio adjustment models may be provided to improve system performance for any other suitable parameters. For example, the LP EGR may be further adjusted to improve aftertreament regeneration. More specifically, the LP EGR may be further adjusted to reduce gas flow through an exhaust gas aftertreatment system and/or to increase exhaust gas temperatures therethrough. Such improvements may be desirable to provide relatively low flow and high temperatures for filter regeneration.

Referring again to FIG. 12, the LP EGR adjustment values from the adjustment models 484, 486, 488 may be communicated to arithmetic nodes downstream of the base model 482. For example, the transient load adjustment value may be compared to the base LP EGR value by a first arithmetic adjustment node 490, which may be a summation node that sums the two signals to yield a transient load adjusted EGR value. In another example, the induction temperature adjustment value may be communicated to the transient load adjusted EGR value by a second arithmetic adjustment node 491, which may be a subtraction node that subtracts the induction temperature value from the transient load adjusted EGR value to yield a temperature and transient load adjusted EGR value. In a further example, the protection adjustment value may be communicated to the temperature and transient load adjusted EGR value by a third arithmetic adjustment node 492, which may also be a subtraction node that subtracts the protection adjustment value from the temperature and transient load adjusted EGR value to yield a final LP EGR value.

The ratio determination block 478 may also include a limit block 494 for comparing an LP EGR value to upper and/or lower LP EGR limits to prevent insufficient and/or excessive LP EGR levels. For example, the limit block 494 may include an upper limit for LP EGR and/or a lower limit for LP EGR. An exemplary upper limit for LP EGR may be 90% and an exemplary lower limit for LP EGR may be 10%. Accordingly, if a final LP EGR value included a 95% LP EGR, then the limit block 494 would override the value and instead output a 90% LP EGR value. Similarly, if a final adjusted EGR value included a 5% LP EGR, then the limit block 494 would override that value and output a 10% LP EGR value. According to another embodiment, another limit block (not shown) may be provided in any suitable location to similarly limit HP EGR.

The LP EGR value is communicated out of the ratio determination block 478 via two branches; one that includes the LP EGR value, and one that calculates and outputs an HP EGR value. In the latter branch, the LP EGR value may be communicated to an arithmetic node 495, which calculates an HP EGR value from the LP EGR value. The arithmetic node 495 may be a subtraction node that subtracts the LP EGR value from a fixed value of 100% to yield a corresponding HP EGR value. Accordingly, the ratio determination block 478 produces an LP EGR value and a corresponding HP EGR value.

Referring again to FIG. 11, the HP EGR value may be communicated from the ratio determination block 478 to the HP/LP dynamic compensation block 480, which may delay the HP EGR value to account for EGR time lag in the system. During steady state system operation, a lowering of a setpoint of one of the HP and LP EGR by a given amount and a raising of a setpoint of the other by the same amount will result in no change to the total EGR. But there is a time lag between HP and LP EGR wherein changes in HP EGR reach the engine before changes in LP EGR because of the relatively greater distance that LP exhaust gases travel compared to HP exhaust gases. In other words, because the LP EGR loop is longer than the HP EGR loop, changes in LP EGR take longer than changes in HP EGR. Accordingly, if the HP and LP EGR setpoints are simultaneously changed by the same amount, then the total EGR will be incorrect for a short period of time. That time represents the delay between when the change in HP EGR reaches the engine and when the change in LP EGR reaches the engine.

In a specific example, if a total EGR of 20% is split 50/50 between HP and LP EGR, then both HP and LP EGR would be 10%. If the HP/LP EGR ratio was changed to 40/60, then HP EGR would decrease to 8% and LP EGR would eventually increase to 12% to yield the 20% total EGR fraction over the long term. But over a shorter term, while the HP EGR would decrease to 8% relatively quickly, the LP EGR would increase relatively slowly and the engine may see less than the 12% LP EGR for some time. Hence, the engine would temporarily experience less than the 20% total EGR, somewhere between 18%-20% total EGR. In other words, the engine would experience a drop in total EGR for a short period of time with a concomitant effect on emissions performance.

Therefore, the dynamic compensation block 480 may correct for such transients in total EGR fraction upon changes in HP/LP EGR ratio, because the total EGR fraction tends to be of higher priority than the HP/LP EGR ratio to maintain exhaust emissions at as low a level as possible at all times. Accordingly, the dynamic compensation block 480 may ensure that changes to the HP/LP EGR ratio are carried out as quickly as possible while substantially maintaining the total EGR fraction. More specifically, the compensation block 480 may delay downstream communication of the HP EGR value so that changes in HP and LP EGR arrive at the engine at substantially the same time.

For example, the compensation block 480 may carry out a fixed delay that is equivalent to a typical delay between changes in HP and LP EGR arriving at an engine. But because the delay may vary depending on varying system operating conditions, the delay may be variable according to a model. In any case, although the delay may temporarily yield an inaccurate HP/LP EGR ratio, it would allow the LP EGR to arrive at the engine at substantially the same time as the HP EGR arrives so as to ensure a substantially constant total EGR fraction. The compensation block 480 could be included elsewhere, such as further downstream in the control flow, but response time may not be as fast.

Referring still to FIG. 11, the LP EGR and HP EGR values may then be communicated to respective arithmetic blocks 496, 497, which may be multiplication blocks that may multiply the LP EGR value and the HP EGR value by the total EGR fraction setpoint 418. The LP EGR setpoint may be determined by multiplying the LP EGR value by the total EGR fraction. In a specific example, a 10% LP EGR can be applied to a total EGR fraction of 20% to yield a 2% LP EGR setpoint (and, conversely, an 18% HP EGR setpoint). If the 20% total EGR increased to 30%, then the same HP/LP EGR ratio would yield a 3% LP EGR and a 27% HP EGR. But, as set forth above, application of the target total EGR fraction to the HP EGR value may be delayed relative to application of the target total EGR fraction to the LP EGR value to account for the lag time between LP and HP EGR.

Although the ratio determination block 478 has been described with respect to a base LP EGR value and LP EGR adjustment values, other embodiments may be equivalent. For example, the ratio determination block 478 may also or instead include a base model to generate an HP EGR base signal, and adjustment models to generate HP EGR adjustment values. In another example, the ratio determination block 478 may also or instead include a base model to generate an HP/LP EGR ratio base signal, and adjustment models to generate HP/LP EGR ratio adjustment values.

According to another embodiment, one or more of the adjustment models 484, 486, 488 may be disabled at any given time and/or under any given system operating conditions. For example, once the engine is running under normal operating temperatures, the induction temperature adjustment model 486 could be disabled. Exemplary normal operating temperature ranges may include 75-85° C. for engine coolant, 70-110° C. for engine oil, and 10-50° C. for engine intake gas.

According to a further embodiment, one or more of the adjustment models 484, 486, 488 may override one or more of the other adjustment models. For example, if a protection adjustment value exceeds a predetermined magnitude, then the transient load adjustment model 484 may be disabled.

Although the exemplary systems and methods have been described in conjunction with a typical HP/LP EGR architecture, any suitable two or more EGR path architecture may be used. For example, the EGR architecture may include an engine internal HP EGR flow path, a dual stage turbo EGR flow path, EGR flow paths without coolers, and/or the like.

The method(s) or any portion thereof may be performed as part of a product such as the system 10 of FIG. 1, and/or as part of a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above may be embodied on a computer usable medium, which include storage devices and signals, in compressed or uncompressed form. Exemplary computer usable storage devices include conventional computer system RAM (random access memory), ROM (read only memory), EPROM (erasable, programmable ROM), EEPROM (electrically erasable, programmable ROM), and magnetic or optical disks or tapes.

The above description of embodiments of the invention is merely exemplary in nature and, thus, variations thereof are not to be regarded as a departure from the spirit and scope of the invention.

What is claimed is:

1. A method of controlling exhaust gas recirculation (EGR) in a turbocharged engine system including a high pressure (HP) EGR path and a low pressure (LP) EGR path, the method comprising:
    determining a target total EGR fraction for compliance with exhaust emissions criteria; and
    using a control subsystem having one or more controllers in communication with one or more sensors constructed and arranged to determine a target HP/LP EGR ratio to optimize other engine system criteria within constraints of the determined target total EGR fraction, and including:
    using at least engine speed and load as an input to a base model to output a base EGR value;
    using at least one other engine system parameter as an input to at least one adjustment model to output at least one EGR adjustment value;
    adjusting the base EGR value with the at least one EGR adjustment value to generate an adjusted EGR value; and
    using the adjusted EGR value to construe controllable engine components to optimize other engine system criteria while ensuring that emissions criteria are met.

2. The method of claim 1, wherein the at least one adjustment model includes a transient load adjustment model for adjusting the base EGR value for the purpose of improving the rate at which combustion gases can be delivered to an engine during operating conditions which allow the engine to intake combustion gases.

3. The method of claim 2, wherein the transient load adjustment model includes:
    determining a target turbocharger boost pressure value;
    comparing the target turbocharger boost pressure with an actual turbocharger boost pressure value; and
    determining the at least one EGR adjustment value based on any variance between the target and actual boost pressure values.

4. The method of claim 2, wherein the transient load adjustment model includes:
    determining a target induction flow value;
    comparing the target induction flow value with an actual induction flow value; and
    determining the at least one EGR adjustment value based on any variance between the target and actual induction flow values.

5. The method of claim 1, wherein the at least one adjustment model includes an induction temperature adjustment model for modifying induction temperatures.

6. The method of claim 5, wherein the induction temperature adjustment model includes:
    determining a target induction temperature value;
    comparing the target induction temperature value with an actual induction temperature value; and
    determining the at least one EGR adjustment value based on any variance between the target and actual induction temperature values.

7. The method of claim 1, wherein the at least one adjustment model includes a turbocharger protection adjustment model for protecting a turbocharger against at least one of overspeed or excessive temperatures.

8. The method of claim 7, wherein the turbocharger protection adjustment model includes:
comparing a maximum turbocharger speed signal and an actual turbocharger speed signal to yield a differential speed signal; and
processing the differential speed signal with at least one other engine system parameter besides turbocharger speed to generate the at least one EUR adjustment value.

9. The method of claim 7, wherein the turbocharger protection adjustment model includes:
comparing a maximum turbocharger compressor tip temperature signal and an actual turbocharger compressor tip temperature signal to yield a differential temperature signal; and
processing the differential temperature signal with at least one other engine system parameter besides turbocharger compressor tip temperature to generate the at least one EGR adjustment value.

10. The method of claim 1, wherein the other engine system criteria include turbocharger protection, fuel economy, and engine performance, and wherein EGR is adjusted to prioritize among the criteria in the following order of decreasing priority: turbocharger protection; exhaust emissions; fuel economy; and engine performance.

11. The method of claim 1, wherein one or more of the adjustment models is disabled under predetermined system operating conditions.

12. The method of claim 11, wherein an induction temperature adjustment model is disabled when an engine is running under normal operating temperatures.

13. The method of claim 1, wherein one or more of the adjustment models overrides one or more of the other adjustment models in order to adhere to a presiding system criteria prioritization.

14. The method of claim 13, wherein a transient load adjustment model is disabled if a turbocharger protection adjustment value exceeds a predetermined magnitude.

15. The method of claim 1, further comprising:
comparing the adjusted EGR value to at least one of an upper or lower EGR limit to prevent at least one of excessive or insufficient EGR 16. The method of claim 1, wherein the adjusted EGR value is an adjusted LP EGR value.

17. The method of claim 16, further comprising:
calculating an HP EGR value using the adjusted LP EGR value; and
delaying downstream communication of the HP EGR value to account for EGR time lag between HP and LP EGR.

18. The method of claim 17, further comprising:
applying the target total EGR fraction to the HP EGR value and the adjusted LP EGR value to generate HP and LP EGR setpoints.

19. The method of claim 1 wherein the at least one other engine system parameter includes at least one of fuel economy, engine system performance, engine system protection, or engine system maintenance.

20. The method of claim 19 wherein the at least one other engine system parameter includes at least one of induction subsystem temperature control or exhaust subsystem temperature control.

21. The method of claim 20 wherein the target HP/LP EGR ratio is determined to increase exhaust subsystem temperatures to regenerate a diesel particulate filter.

22. The method of claim 20 wherein the target HP/LP EGR ratio is determined to reduce induction subsystem temperatures.

23. The method of claim 20 wherein the target HP/LP EGR ratio is determined to control induction air temperature to avoid condensation.

24. The method of claim 19 wherein the target HP/LP EGR ratio is determined to avoid turbocharger overspeeding.

25. The method of claim 19 wherein the target HP/LP EGR ratio is determined to increase torque output in response to driver demand for vehicle acceleration.

26. The method of claim 19 wherein the target HP/LP EGR ratio is determined to provide a higher percentage of LP EGR to reduce turbocharger lag.

27. The method of claim 19 wherein the target HP/LP EGR ratio is determined to allow the total EGR fraction to be achieved without closing intake or exhaust valves.

28. The method of claim 19 wherein the target HP/LP EGR ratio is determined to optimize induction air temperature for maximum fuel economy.

29. The method of claim 19 wherein the target HP/LP EGR ratio is determined to reduce exhaust emissions.

30. The method of claim 19 wherein the target HP/LP EGR ratio is determined by open-loop control to improve EGR response.

31. The method of claim 19 wherein the target HP/LP EGR ratio is determined to reduce compressor tip overheating.

32. The method of claim 19 further comprising: changing amounts of EGR gas flowing through at least one of a low pressure EGR passage or a high pressure EGR passage to increase temperature of an exhaust subsystem device.

33. A computer usable medium embodying instructions executable by a processor to enable a method of controlling exhaust gas recirculation (EGR) in a turbocharged engine system including a high pressure (RP) EGR path and a low pressure (LP) EGR path, the method comprising:
determining a target total EGR fraction for compliance with exhaust emissions criteria; and
using a control subsystem having one or more controllers in communication with one or more sensors constructed and arranged to determine a target HP/LP EGR ratio to optimize other engine system criteria within the constraints of the determined target total EGR fraction, and including:
using at least engine speed and load as an input to a base model to output a base EGR value;
using at least one other engine system parameter as an input to at least one adjustment model to output at least one EGR adjustment value;
adjusting the base EGR value with the at least one EGR adjustment value to generate an adjusted EGR value; and
using the adjusted EGR value to construe controllable engine components to optimize other engine system criteria while ensuring that emissions criteria are met.

34. A product including apparatus for implementing a method of controlling exhaust gas recirculation (EGR) in a turbocharged engine system including a high pressure (HP) EGR path and a low pressure (LP) EGR path, the method comprising:
determining a target total EGR fraction for compliance with exhaust emissions criteria; and
using a control subsystem having one or more controllers in communication with one or more sensors constructed and arranged to determine a target HP/LP EGR ratio to optimize other engine system criteria within the constraints of the determined target total EGR fraction, and including:
using at least engine speed and load as an input to a base model to output a base EGR value;

using at least one other engine system parameter as an input to at least one adjustment model to output at least one EGR adjustment value; and adjusting the base EGR value with the at least one EGR adjustment value to generate an adjusted EGR value; and using the adjusted EGR value to construe controllable engine components to optimize other engine system criteria while ensuring that emissions criteria are met.

35. An exhaust gas recirculation apparatus for an internal combustion engine for use in carrying out a method of controlling exhaust gas recirculation (EGR) in a turbocharged engine system including a high pressure (HP) EGR path and a low pressure (LP) EGR path, the method comprising:

determining a target total EGR fraction for compliance with exhaust emissions criteria; and using a control subsystem having one or more controllers in communication with one or more sensors constructed and arranged to determine a target HP/LP EGR ratio to optimize other engine system criteria within constraints of the determined target total EGR fraction, and including:

using at least engine speed and load as an input to a base model to output a base EGR value;

using at least one of fuel economy, engine system performance, engine system protection, or engine system maintenance as an input to at least one adjustment model to output at least one EGR adjustment value;

adjusting the base EGR value with the at least one EGR adjustment value to generate an adjusted EGR value; and using the adjusted EGR value to construe controllable engine components to optimize other engine system criteria while ensuring that emissions criteria are met; and changing amounts of EGR gas flowing through at least one of a low pressure EGR passage or a high pressure EGR passage to increase temperature of an exhaust subsystem device, comprising:

a control subsystem having one or more controllers in communication with one or more sensors constructed and arranged to determine a target HP/LP EGR ratio to optimize other engine system criteria within constraints of the determined target total EGR fraction a turbocharger provided with a turbine in an exhaust passage and a compressor and an intake passage;

a low pressure EGR passage which connects the exhaust passage downstream of the turbine with the intake passage upstream of the compressor;

a high pressure EGR passage which connects the exhaust passage upstream of the turbine with the intake passage downstream of the compressor;

an intake manifold which connects the intake passage to the engine and an exhaust manifold which connects the exhaust passage to the engine;

an induction subsystem device in the intake passage and an exhaust subsystem device in the exhaust passage; and at least one EGR valve changes amounts of EGR gas flowing through at least one of the low pressure EGR passage or the high pressure EGR passage such that at least one of the induction subsystem device or the exhaust subsystem device temperature is controlled.

36. An apparatus as set forth in claim 35 wherein the exhaust subsystem device is a catalytic converter.

37. An apparatus as set forth in claim 35 wherein the exhaust subsystem device is a diesel particulate filter.

38. An apparatus as set forth in claim 35 wherein the exhaust subsystem device comprises a nitrogen oxide absorber unit.

* * * * *